(12) United States Patent
Luo et al.

(10) Patent No.: US 11,914,846 B2
(45) Date of Patent: Feb. 27, 2024

(54) INTERACTION PROCESSING METHOD AND APPARATUS FOR INFORMATION FLOW, AND ELECTRONIC DEVICE

(71) Applicant: Tencent Technology (Shenzhen) Company Limited, Shenzhen (CN)

(72) Inventors: Qiqi Luo, Shenzhen (CN); Yanhui Shen, Shenzhen (CN); Jing Kou, Shenzhen (CN); Jingwen Wang, Shenzhen (CN); Leibing Qiu, Shenzhen (CN); Junhui Xi, Shenzhen (CN); Qian Zhang, Shenzhen (CN); Runlin Han, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 81 days.

(21) Appl. No.: 17/718,883

(22) Filed: Apr. 12, 2022

(65) Prior Publication Data
US 2022/0236844 A1 Jul. 28, 2022

Related U.S. Application Data

(63) Continuation of application No. PCT/CN2021/086069, filed on Apr. 9, 2021.

(30) Foreign Application Priority Data

May 9, 2020 (CN) .......................... 202010389026.5

(51) Int. Cl.
*G06F 3/0484* (2022.01)
*G06F 9/451* (2018.01)
*G06F 3/0481* (2022.01)

(52) U.S. Cl.
CPC .......... *G06F 3/0484* (2013.01); *G06F 3/0481* (2013.01); *G06F 9/451* (2018.02); *G06F 2203/04803* (2013.01)

(58) Field of Classification Search
CPC ...... G06F 3/0484; G06F 9/451; G06F 3/0481; G06F 2203/04803
See application file for complete search history.

(56) References Cited

U.S. PATENT DOCUMENTS 5,831,616 A * 11/1998 Lee ..................... G06F 16/7335
715/977
2008/0141153 A1* 6/2008 Samson ............... G06F 3/0481
715/769
(Continued)

FOREIGN PATENT DOCUMENTS

CN 106303654 A 1/2017
CN 106803975 A 6/2017
(Continued)

OTHER PUBLICATIONS

International Search Report and Written Opinion received for Application No. PCT/CN2021/086069 dated Jul. 15, 2021 (English and Chinese languages) (9 pages).

*Primary Examiner* — William L Bashore
*Assistant Examiner* — Gregory A Distefano
(74) *Attorney, Agent, or Firm* — Crowell & Moring LLP

(57) ABSTRACT

An interaction processing method and apparatus for an information flow includes displaying the information flow in an information flow region. The interaction region is inserted into the information flow and an interaction material corresponding to the interaction region is displayed in a search region. In response to an interaction operation for the interaction region, an interaction process based on the interaction material in the interaction region is displayed.

20 Claims, 20 Drawing Sheets

(56) References Cited

U.S. PATENT DOCUMENTS

| | | | |
|---|---|---|---|
| 2011/0087994 A1* | 4/2011 | Swink | H04L 51/52 |
| | | | 715/810 |
| 2012/0054167 A1* | 3/2012 | Chi | G06F 16/9535 |
| | | | 707/706 |
| 2013/0086530 A1* | 4/2013 | Gandhi | G06F 3/0484 |
| | | | 715/862 |
| 2013/0174023 A1* | 7/2013 | Marantz | G06F 16/9577 |
| | | | 715/248 |
| 2014/0229834 A1 | 8/2014 | Jain | |
| 2015/0278994 A1* | 10/2015 | Reed | G06F 3/0481 |
| | | | 345/635 |
| 2016/0073223 A1* | 3/2016 | Woolsey | G01C 21/3438 |
| | | | 455/457 |
| 2018/0348961 A1* | 12/2018 | Wilczynski | G06F 3/0481 |
| 2019/0324826 A1* | 10/2019 | Abuelata | G06F 3/048 |
| 2021/0065202 A1* | 3/2021 | Bansal | G06Q 30/016 |

FOREIGN PATENT DOCUMENTS

| | | | |
|---|---|---|---|
| CN | 110097397 A | | 8/2019 |
| CN | 111580913 A | | 8/2020 |
| CN | 111580914 A | | 8/2020 |
| JP | 2020048165 A | * | 3/2020 |

\* cited by examiner

INTERACTION PROCESSING METHOD AND APPARATUS FOR INFORMATION FLOW, AND ELECTRONIC DEVICE

RELATED APPLICATION

This application claims priority to PCT Application No. PCT/CN2021/086069, filed Apr. 9, 2021, published as WO 2021/227721 A1, entitled "INTERACTION PROCESSING METHOD AND APPARATUS FOR INFORMATION FLOW, AND ELECTRONIC DEVICE", which claims priority to Chinese Patent Application No. 202010389026.5 filed on May 9, 2020, each of which are incorporated herein by reference in their entirety.

FIELD OF THE TECHNOLOGY

This application relates to an interaction processing method and apparatus for an information flow.

BACKGROUND OF THE DISCLOSURE

With the development of computer technologies and information technologies, presentation manners of information have characteristics of diversification and personalization. As a popular presentation manner, an information flow is mainly to display a plurality of pieces of information on an application interface in a specific order, that is, to present the information in a streaming form, which can help users continuously obtain new information. Information flows can be widely applied to various scenarios, such as an information application, a social application, and a video application.

SUMMARY

An embodiment of this application provides an interaction processing method for an information flow, performed by an electronic device, the method including:

displaying an information flow in an information flow region, at least one interaction region being inserted into the information flow;

displaying an interaction material corresponding to the interaction region in a search region; and displaying, in response to an interaction operation for the interaction region, an interaction process based on the interaction material in the interaction region.

An embodiment of this application provides an interaction processing apparatus for an information flow, including:

an information flow module, configured to display an information flow in an information flow region, at least one interaction region being inserted into the information flow;

a search module, configured to display an interaction material corresponding to the interaction region in a search region; and an interaction module, configured to display, in response to an interaction operation for the interaction region, an interaction process based on the interaction material in the interaction region.

An embodiment of this application provides an electronic device, including:

a memory, configured to store executable instructions; and a processor, configured to perform the interaction processing method for an information flow provided in the embodiments of this application when executing the executable instructions stored in the memory.

An embodiment of this application provides a computer-readable storage medium, storing executable instructions, the executable instructions, when executed by a processor, causing the processor to perform the interaction processing method for an information flow provided in the embodiments of this application.

DESCRIPTION OF EMBODIMENTS

Figure 1:
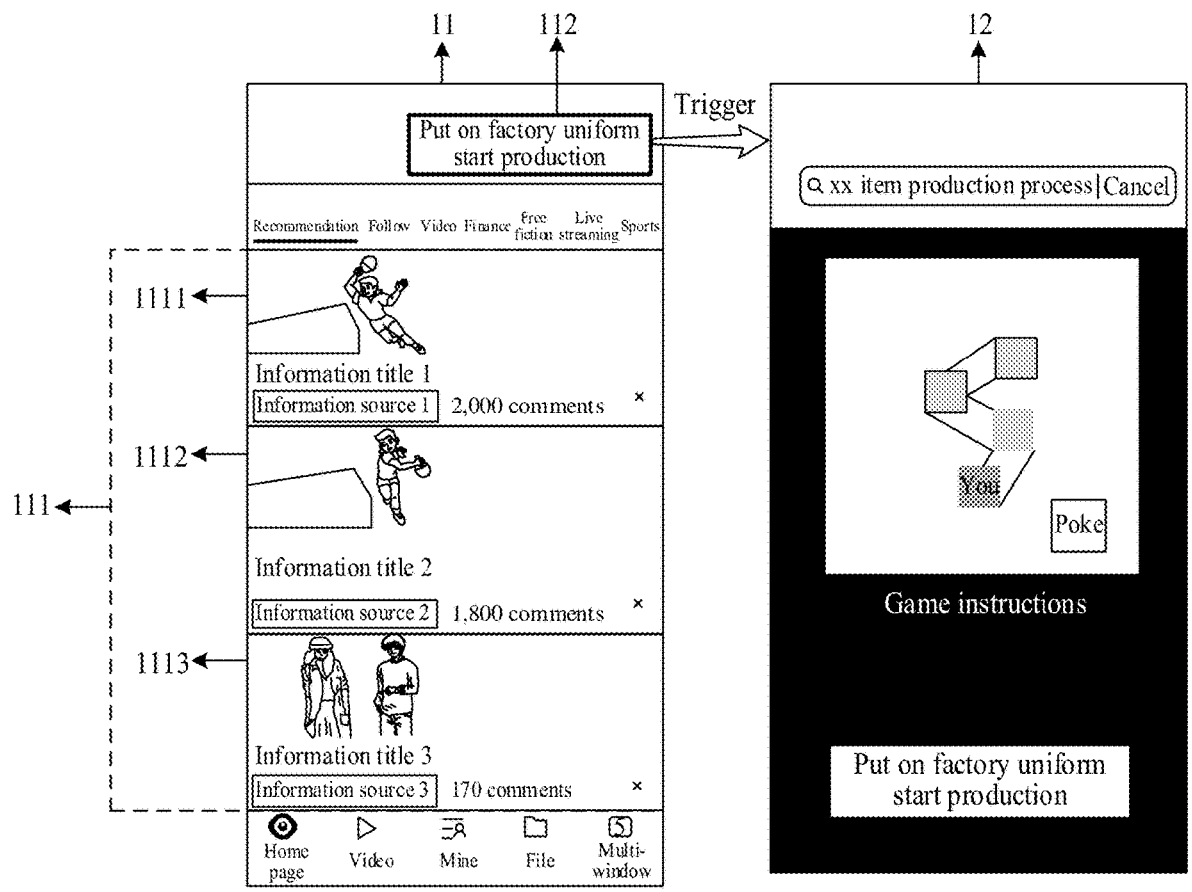
FIG. 1 is a schematic diagram of an application interface according to the related art.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe subsets of all possible embodiments. However, it may be understood that the "some embodiments" may be the same subset or different subsets of all the possible embodiments, and may be combined with each other without conflict.

In the following descriptions, the included term "first/second" is merely intended to distinguish similar objects but does not indicate a specific order of an object. It may be understood that "first/second" is interchangeable in terms of a specific order or sequence if permitted, so that the embodiments of this application described herein can be implemented in a sequence in addition to the sequence shown or described herein. In the following description, the related term "plurality of" means at least two.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

1) Model view controller (MVC) framework: It is an architecture that separates service logic, data, and interface display, where the view is mainly responsible for the interface display, the model is mainly responsible for management of the data, and the controller is configured to coordinate the view and the model. A relationship chain in the architecture is that: an interface view (that is, the view) transmits an event to the controller; the controller notifies the model to update the data; the model updates the data and then notifies the controller to update the data; and after learning of the data update, the controller notifies the interface view to update the interface. The event generally refers to an operation that can be perceived by the interface view, for example, a click operation.

2) Information flow: It is an information presentation manner, for example, displaying a set of information (a plurality of pieces of information) in a set information flow region of an application interface, where a position of the information in the information flow region may be updated according to a specific operation (for example, a movement operation). In an interface view of the application, the information flow in the information flow region is displayed by an information flow framework layer.

3) Search region: It is a region in the application interface configured for providing an information search function, which may be presented in the form of a search box and the like. In the interface view, content in the search region is displayed by a search layer.

4) interaction region: It is a region in the application interface configured for providing an interaction function. The content in the interaction region may vary in different examples for these embodiments. For example, the content may be a small game, a short video, live streaming, or an advertisement. In the interface view, the content in the interaction region is displayed by an interaction layer.

5) interaction material: It is a material corresponding to the interaction region. The type of the interaction material may vary in different examples for these embodiments. For example, the interaction material may be at least one of an interaction element and an interaction introduction, where the interaction element refers to any visual object participating in a man-machine interaction operation in an interaction process, which can change a position and/or display effects thereof according to the man-machine interaction operation; and the interaction introduction refers to an introduction for the interaction process, which may be presented in the forms of text, images, and the like.

6) interaction process: It is a process in which the content in the interaction region changes with an interaction operation for the interaction region.

In the presentation manner of the information flow, to lengthen a stay duration of a user in the information flow, a solution provided in the related art is to set a fixed button independent of the information flow region in the interface, and when the fixed button is triggered, a new interaction interface is jumped to for interaction. For example, a schematic diagram of an application interface according to the related art shown in FIG. 1 is provided. In a recommendation interface 11 of an application, an information flow region 111 and a fixed button 112 are displayed. An information flow in the information flow region 111 includes information 1111, information 1112, and information 1113. Each piece of information is presented in a tabular structure, and the tabular structure includes elements such as an information title, an information source, and the quantity of comments. The fixed button 112 is a button of an interaction function. When the fixed button 112 is triggered, for example, when the user clicks or long presses the fixed button 112, a new interface 12 is jumped to, and an interaction process is displayed in the new interface 12. A small game for producing xx items is used as an example in FIG. 1. As shown in FIG. 1, in a process of browsing the information flow by the user, the fixed button configured for interaction is easily ignored. Therefore, in the solution provided in the related art, the user cannot be effectively attracted to stay in the information flow, which causes computing resources of an electronic device used for presenting the information flow to be wasted, and also results in low man-machine interaction efficiency and poor man-machine interaction experience.

The embodiments of this application provide an interaction processing method and apparatus for an information flow, an electronic device, and a computer-readable storage medium, which can improve an actual utilization of computing resources of an electronic device, improve interaction effects, and enhance users' interaction experience during browsing of an information flow. Example applications of the electronic device provided in the embodiments of this application are described below.

Figure 2:
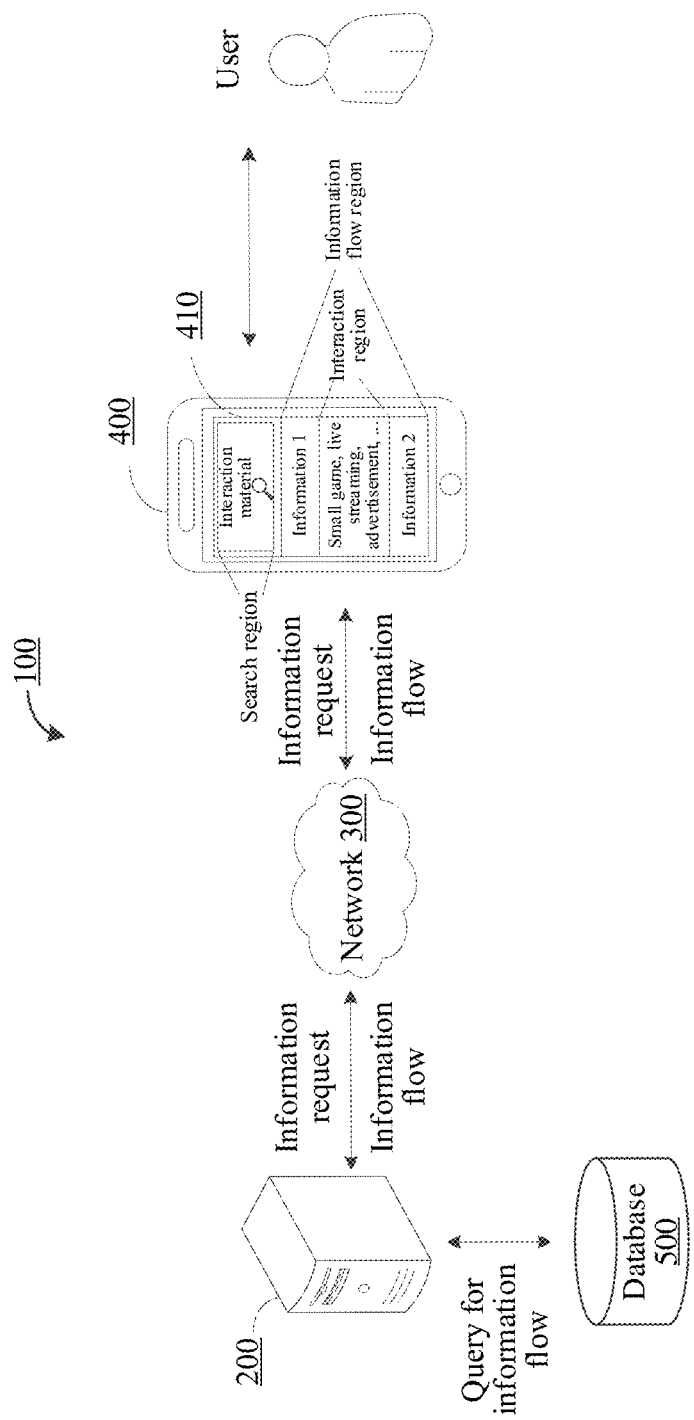
FIG. 2 is a schematic architectural diagram of an interaction processing system for an information flow according to an embodiment of this application.

FIG. 2 is a schematic architectural diagram of an interaction processing system for an information flow 100 according to an embodiment of this application. A terminal device 400 is connected to a server 200 by using a network 300, and the server 200 is connected to a database 500. The network 300 may be a wide area network or a local area network, or a combination thereof.

In some embodiments, the interaction processing method for an information flow provided in the embodiments of this application may be implemented by the terminal device and the server cooperatively. For example, when an application (for example, an online application) starts or when receiving a refresh operation on an information flow in the application, the terminal device 400 sends an information request to the server 200. The server 200 queries the database 500 for an information flow corresponding to the information request, and sends the information flow obtained through the query to the terminal device 400. The information request may include information such as a user account in a login state in the application, so that the server 200 finds a corresponding user portrait according to the information request, and screens the information flow that meets the user's preferences in the database 500 according to the user portrait, thereby implementing targeted recommendation.

After receiving the information flow, the terminal device 400 displays the information flow in a graphical interface 410. For example, the terminal device 400 divides the graphical interface 410 into an information flow region and a search region, and displays the received information flow in the information flow region; and in FIG. 2, the information flow includes information 1, information 2, and the like. Besides, the terminal device 400 inserts at least one interaction region into the information flow, to improve the recognizability of the at least one interaction region, thereby facilitating the user in discovering the at least one interaction region in a process of browsing the information flow and performing interaction. In addition, the terminal device 400 further displays an interaction material corresponding to the interaction region in the search region, and if an interaction operation for the interaction region is received, the terminal device displays an interaction process based on the interaction material in the interaction region, and displays a new interaction material in the search region.

For example, if content in the interaction region is a small tile-matching video game, the search region may display a game prop. When the game prop drops from the search region to the interaction region, the user may click or long press the game prop in the interaction region to eliminate the game prop for interaction. In another example, if the content in the interaction region is video live streaming, the search region may display a record of gift giving during the video live streaming, and the user may click or long press a gift-giving button in the interaction region to make a gift-giving record of the user appear in the search region.

In some embodiments, the interaction processing method for an information flow provided in the embodiments of this application may be implemented by the terminal device. For example, when an application (for example, an online application) starts or when receiving a refresh operation on an information flow in the application, the terminal device 400 may obtain a corresponding information flow through local search and display the information flow. In the embodiments of this application, a storage location of the information flow is the foregoing database 500 and the local terminal device 400 in one example embodiment. For example, the information flow may alternatively be stored in a blockchain network, a distributed file system of the server 200 and other locations.

In the embodiments of this application, the server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal device may be various types of terminal devices such as a notebook computer, a tablet computer, a desktop computer, a set-top box or a mobile device (for example, a mobile phone, a portable music player, a personal digital assistant (PDA), a dedicated messaging device, or a portable game device), but those are just a few examples. The terminal device and the server may be directly or indirectly connected in a wired or wireless communication manner in some examples.

The following continues to describe example applications of the electronic device provided in the embodiments of this application. A description is made by using an example in which the electronic device is a terminal device.

Figure 3:
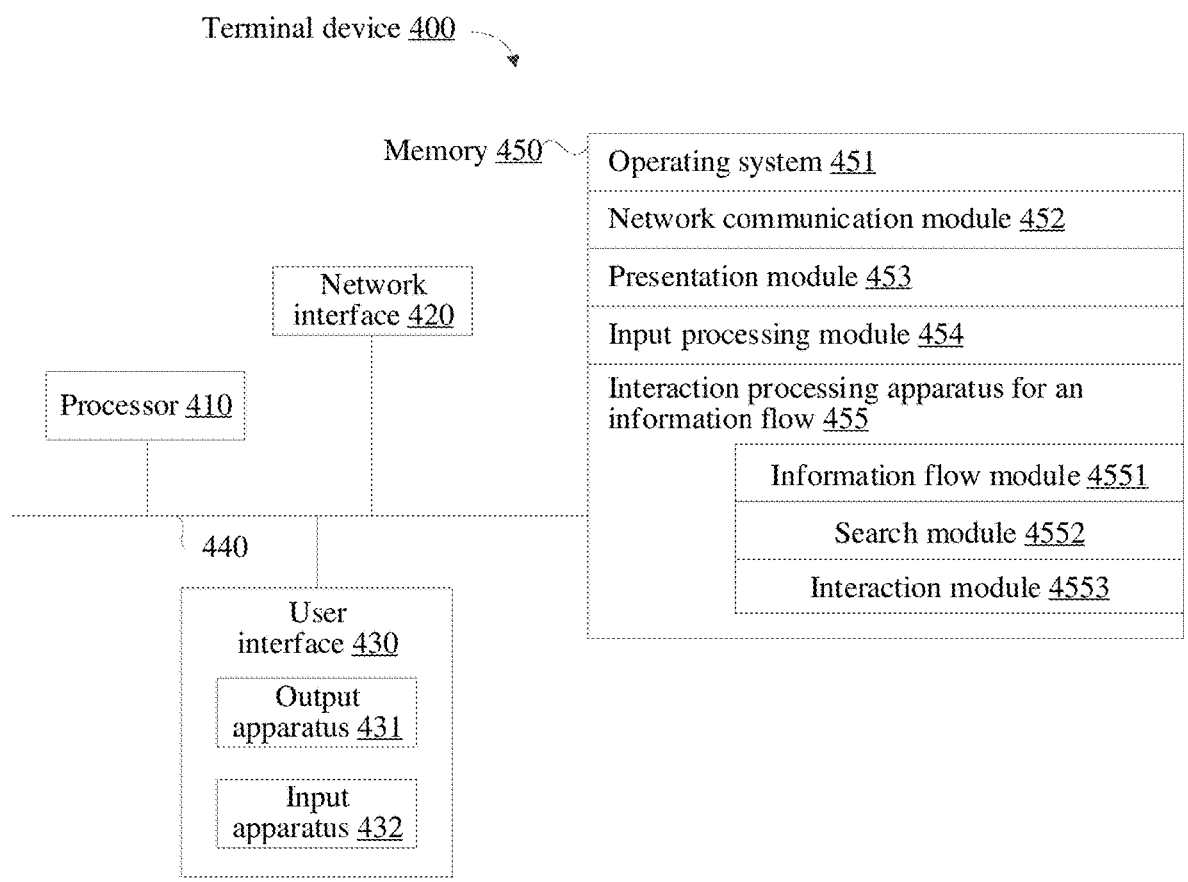
FIG. 3 is a schematic architectural diagram of a terminal device according to an embodiment of this application.

FIG. 3 is a schematic architectural diagram of a terminal device 400 (which may be, for example, the terminal device 400 shown in FIG. 2) according to an embodiment of this application. The terminal device 400 shown in FIG. 3 includes at least one processor 410, a memory 450, at least one network interface 420, and a user interface 430. The components in the terminal device 400 are coupled together by a bus system 440. It may be understood that the bus system 440 is configured to implement connection and communication between the components. In addition to a data bus, the bus system 440 further includes a power bus, a control bus, and a status signal bus. However, for ease of clear description, all types of buses are marked as the bus system 440 in FIG. 3.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that can display media content, including one or more speakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Example hardware devices include a solid-state memory, a hard disk drive, an optical disc driver, or the like. The memory 450 may include one or more storage devices that are physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this application is to include any suitable type of memories.

In some embodiments, the memory 450 can store data to support various operations. Examples of the data include a program, a module, and a data structure, or a subset or a superset thereof, which are described below by using examples.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Example network interfaces 420 include: Bluetooth, wireless compatible authentication (WiFi), a universal serial bus (USB), and the like.

A presentation module 453 is configured to present information by using one or more output apparatuses 431 (for example, a display screen or a speaker) associated with the user interface 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the interaction processing apparatus for an information flow provided in the embodiments of this application may be implemented by using software. FIG. 3 shows an interaction processing apparatus for an information flow 455 stored in the memory 450. The apparatus may be software in a form such as a program and a plug-in, and includes the following software modules: an information flow module 4551, a search module 4552, and an interaction module 4553. These modules may be logical modules, and may be combined or further divided based on a function to be performed in some examples. The following describes functions of the modules.

The following describes application examples of the information flow module 4551, the search module 4552, and the interaction module 4553 in the interaction processing apparatus for an information flow 455 in the terminal device 400 by using an example in which a first application 600 and a second application 700 are running in the terminal device 400.

The first application 600 and the second application 700 are first described.

The first application 600 may be a related application based on information flows, such as a social network client that displays a user's social dynamic information flow, or a news client that displays a news information flow in which the user is interested. The second application 700 may be a client with an interaction function, for example, an applet (for example, an applet with a game function, namely, a small game. Certainly, the second application may alternatively be an applet with other functions, for example, a shopping applet) or a live streaming client.

Forms of the first application 600 and the second application 700 may be diversified.

For example, both the first application 600 and the second application 700 may be native applications (APPs) of the terminal device, that is, applications that can be run after being downloaded and installed in the terminal device 400. An interaction region can be inserted into the information flow of the first application 600 to carry the interaction function of the second application 700, so that the interaction function of the second application 700 is used without leaving a view of the first application 600.

In another example, the first application 600 may be a native application, and the second application 700 may be an applet. The first application 600 may automatically download the second application 700 or download the second application 700 according to a user instruction, and an interaction region is inserted into the information flow of the first application 600 to carry the interaction function of the second application 700, so that the interaction function of the second application 700 is used without leaving the view of the first application 600.

The first application 600 and the second application 700 are used as an example herein to describe application examples of the information flow framework layer (configured to implement at least some functions of the information flow module 4551), the search layer (configured to implement at least some functions of the search module 4552), and the interaction layer (configured to implement at least some functions of the interaction module 4553).

Figure 4A:
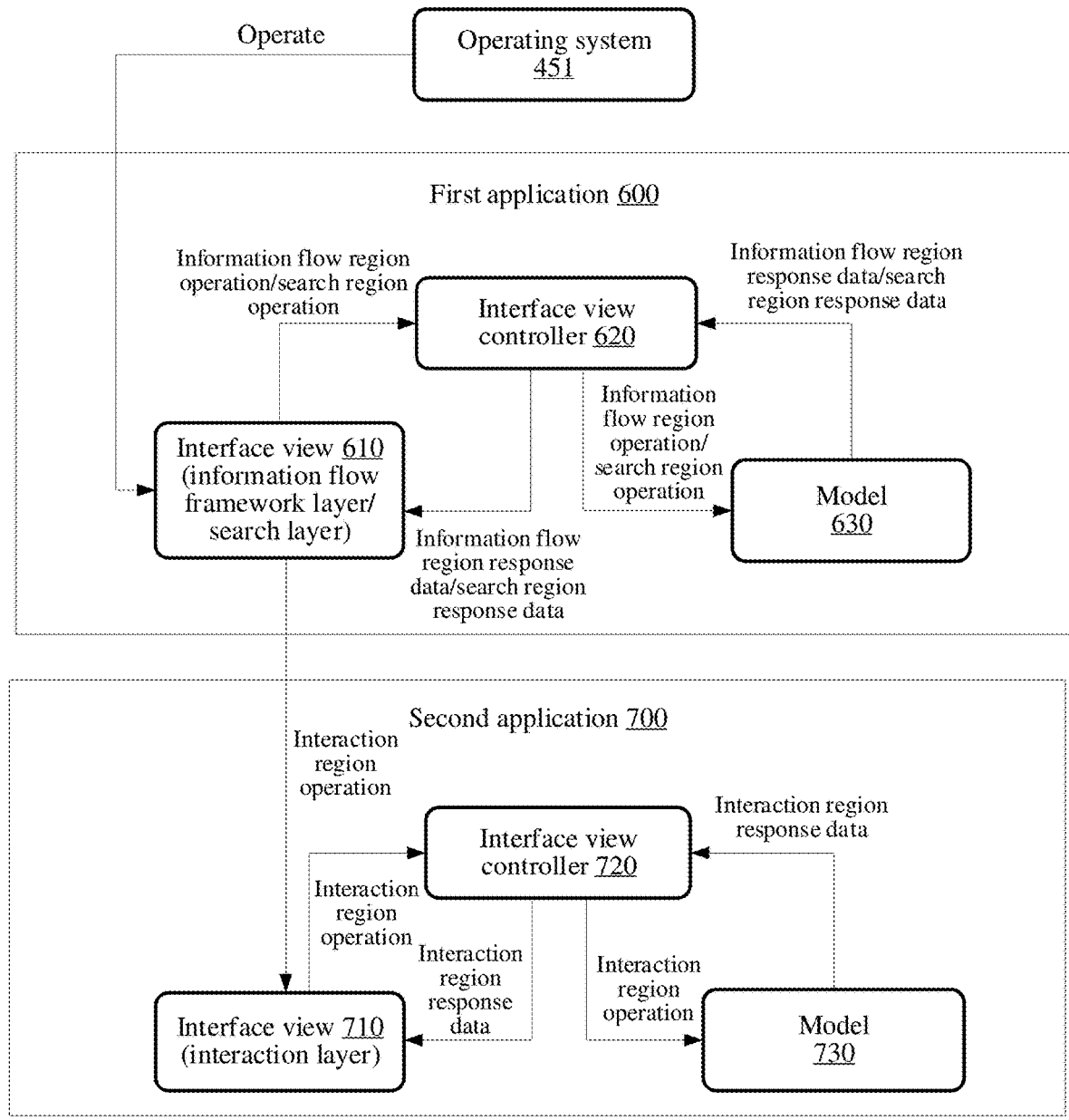
FIG. 4A and FIG. 4B are schematic architectural diagrams of applications according to an embodiment of this application.

In some embodiments, FIG. 4A is a schematic architectural diagram of the first application 600 and the second application 700 running in the terminal device 400 according to an embodiment of this application. The information flow framework layer and the search layer may be implemented as a child view in an interface view 610 of the first application 600, and the interaction layer may be implemented as a child view in an interface view 710 of the second application 700. The information flow framework layer inserts a transparent region configured for avoiding an interaction region loaded by the interaction layer between information displayed in the information flow region, so that the interaction region loaded by the interaction layer can be displayed through the transparent region.

The operating system 451 sends an operation acquired from the input processing module 454 (for example, a touch operation performed by the user in a screen of the terminal device 400) to the interface view 610 in the form of an event. If an operation position is in the information flow region, the operation is an information flow region operation; and if the operation position is in the search region, the operation is a search region operation.

For the information flow region operation, the information flow framework layer in the interface view 610 sends the information flow region operation to a model 630 by using an interface view controller 620. The model 630 calculates information flow region response data according to the information flow region operation, and returns the information flow region response data to the information flow framework layer, so that the information flow framework layer updates and displays the information flow region according to the information flow region response data.

Similarly, for the search region operation, the search layer in interface view 610 sends the search region operation to the model 630 by using the interface view controller 620. The model 630 calculates search region response data according to the search region operation, and returns the search region response data to the search layer, so that the search layer updates and displays the search region according to the search region response data.

If the operation position is in the transparent region, because the transparent region is configured for display of interaction regions, the operation is an interaction region operation. The information flow framework layer in the interface view 610 sends the interaction region operation to the interface view 710 of the second application 700, and an interaction layer in the interface view 710 sends the interaction region operation to a model 730 by using an interface view controller 720. The model 730 calculates interaction region response data according to the interaction region operation, and returns the interaction region response data to the interaction layer, so that the interaction layer updates and displays the interaction region.

Figure 4B:
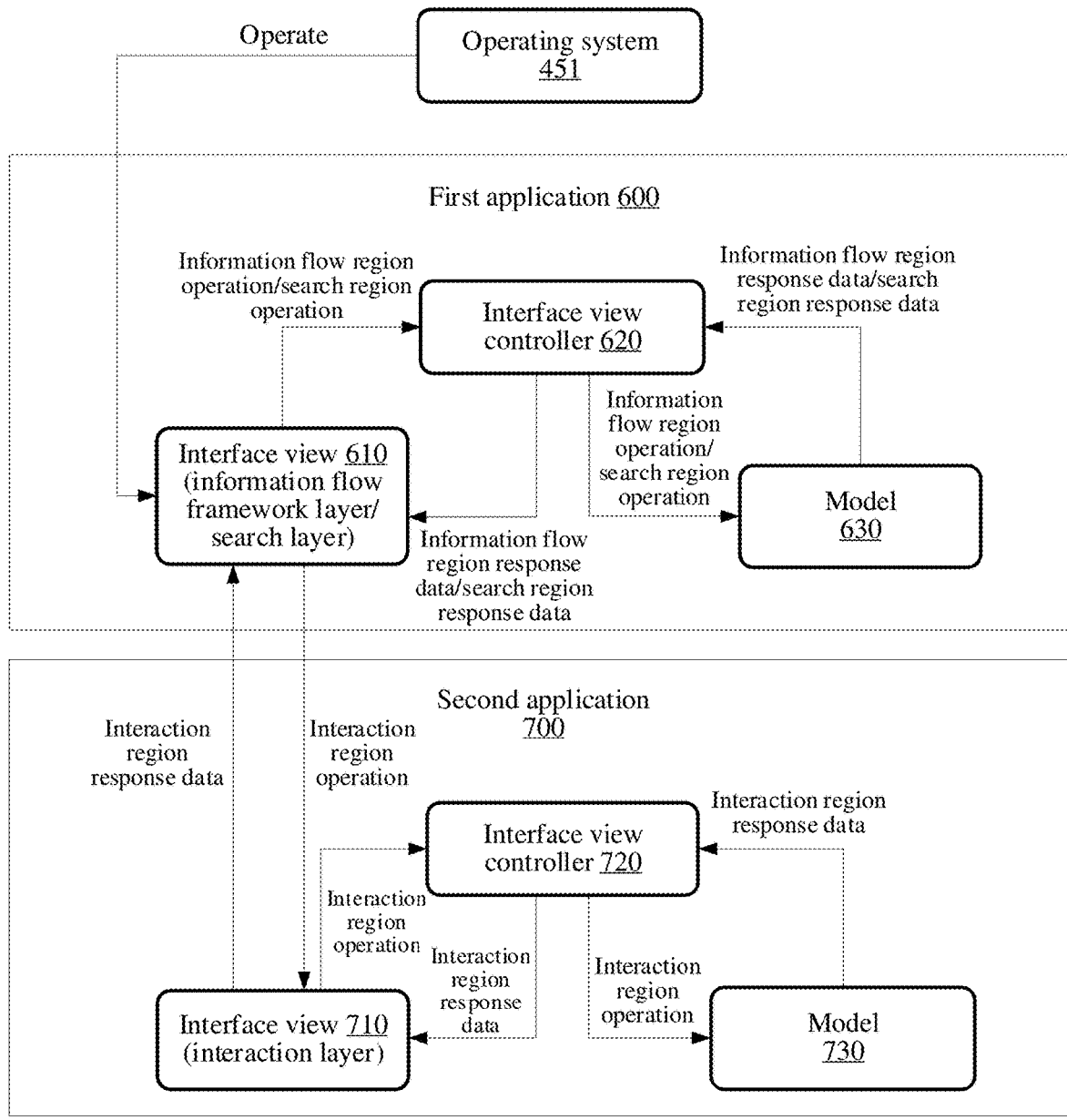

In some other embodiments, FIG. 4B is a schematic architectural diagram of the first application 600 and the second application 700 running in the terminal device 400 according to an embodiment of this application. The information flow framework layer and the search layer may be implemented as a child view of the interface view 610 of the first application 600. The information flow framework layer inserts an interaction region between the information displayed in the information flow region. That is, both the interaction region and the information flow region are loaded by the information flow framework layer for display and control. The interaction layer may be implemented as a child view of the interface view 710 of the second application 700, and is not responsible for the display and control of interaction regions.

The operating system 451 sends an operation acquired from the input processing module 454 (for example, a touch operation performed by the user in a screen of the terminal device 400) to the interface view 610 in the form of an event. If an operation position is in the information flow region, the operation is an information flow region operation; and if the operation position is in the search region, the operation is a search region operation.

For the information flow region operation, the information flow framework layer in the interface view 610 sends the information flow region operation to a model 630 by using an interface view controller 620. The model 630 calculates information flow region response data according to the information flow region operation, and returns the information flow region response data to the information flow framework layer, so that the information flow framework layer updates and displays the information flow region according to the information flow region response data.

Similarly, for the search region operation, the search layer in interface view 610 sends the search region operation to the model 630 by using the interface view controller 620. The model 630 calculates search region response data according to the search region operation, and returns the search region response data to the search layer, so that the search layer updates and displays the search region according to the search region response data.

If the operation position is in the interaction region, the operation is an interaction region operation. The information flow framework layer in the interface view 610 sends the interaction region operation to the interface view 710 of the second application 700, and an interaction layer in the interface view 710 sends the interaction region operation to a model 730 by using an interface view controller 720. The model 730 calculates interaction region response data according to the interaction region operation, and returns the interaction region response data to the interaction layer, and then the interaction layer returns the interaction region response data to the information flow framework layer, so that the information flow framework layer updates and displays the interaction region according to the interaction region response data.

Each of the information flow framework layer, the search layer and the interaction layer may have a corresponding controller and a corresponding model. Alternatively, the information flow framework layer and the search layer share a controller and a model, and the interaction layer has an independent controller and an independent model. These embodiments are merely examples, and other feasible architectures may alternatively be applied to the embodiments of this application. The interface view, the interface view controller, and the model may be fully integrated inside the terminal device, and may alternatively be combined with the server to achieve data update. For example, the model may be configured to perform data exchange with the backend (the server and the database) and obtain the updated data from the backend.

The interaction processing method for an information flow provided in the embodiments of this application may be performed by the terminal device, or may be performed by the server and the terminal device jointly.

The process of implementing the interaction processing method for an information flow by using an embedded interaction processing apparatus for an information flow in the electronic device is described below with reference to the example applications and structure of the electronic device described above.

Figure 5A:
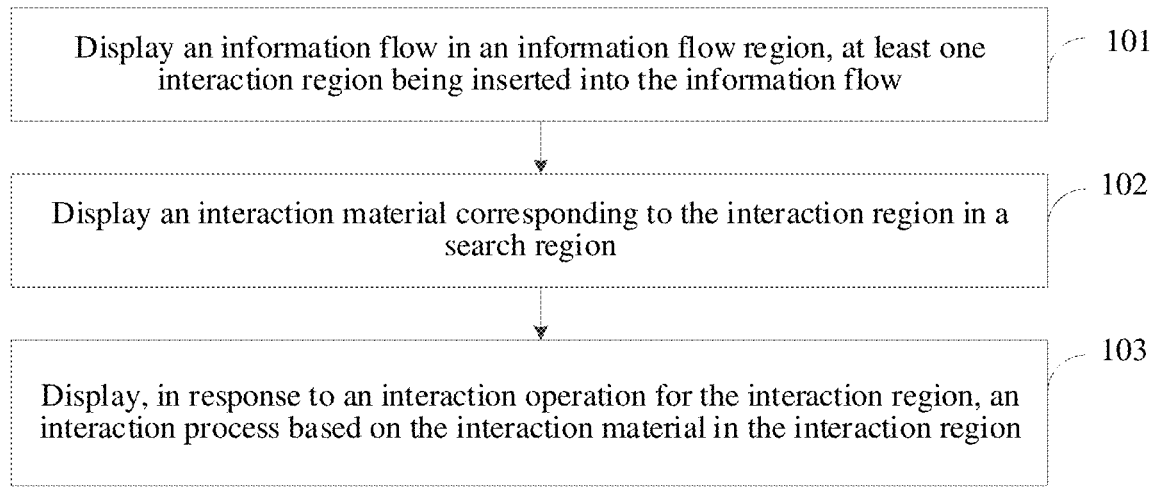
FIG. 5A to FIG. 5H are schematic flowcharts of an interaction processing method for an information flow according to an embodiment of this application.

FIG. 5A is a schematic flowchart of an interaction processing method for an information flow according to an embodiment of this application. A description is made with reference to steps shown in FIG. 5A.

Step 101: Display an information flow in an information flow region, at least one interaction region being inserted into the information flow.

The information flow herein may be pre-cached, or may be obtained online. For example, the terminal device may obtain a locally stored information flow; or the terminal device may initiate an information request to the server according to a user account in a login state in an application, and the server searches for a user portrait corresponding to the user account according to the received information request, screens an information flow corresponding to the user portrait in the database, and sends the obtained information flow to the terminal device.

During obtaining of the information flow, the information flow may be displayed in a set information flow region in an interface. At least one interaction region is inserted into the information flow, and a proportion of the at least one inserted interaction region may vary in this embodiment of this application, which may be set according to an actual application scenario. For example, one interaction region is inserted into the information flow every other L pieces of information, L being an integer greater than 0.

In some embodiments, after step 101, the method further includes: updating, in response to a movement operation for the information flow, a position of information in the information flow in the information flow region and a position of the interaction region in the information flow region.

Herein, when a movement operation for the information flow, for example, an operation for sliding the information flow, is received, a position of information in the information flow in the information flow region and a position of the interaction region in the information flow region are updated. In this way, a user can view information required by the user and an interaction region through a movement operation.

Step 102: Display an interaction material corresponding to the interaction region in a search region.

A form and a position of the search region may vary in this embodiment of this application. For example, the search region may be in the form of a block or a circle, and the search region may be located above the information flow region or at other positions. In this embodiment of this application, the interaction material corresponding to the interaction region may be displayed in the search region, and the interaction material may also vary for different example embodiments. For example, the interaction material may be static or dynamic.

In some embodiments, between any steps, the method further includes: receiving a keyword entered in the search region; and searching the information flow for information matching the keyword, and displaying a detail interface corresponding to the information matching the keyword.

Herein, manners of entering the keyword are not limited, and include, but not limited to, forms such as handwriting input, voice input, and photographic input. After the search region is displayed, the keyword entered in the search region may be received. The information flow is queried for the information matching the keyword, and a detail interface corresponding to the information matching the keyword is displayed, for example, jumping to a detail interface corresponding to the information matching the keyword.

In addition to querying the information flow for the information matching the keyword, the backend (such as a server and a database) may also be accessed to find the information matching the keyword in the information at the backend. In addition, a matching manner is not limited in this embodiment of this application. For example, if a certain piece of information includes the keyword, it is considered that the information matches the keyword. In the foregoing manner, in addition to being configured for displaying the interaction material, the search region may further provide an information search function, which improves the diversity at the functional level.

In some embodiments, the displaying an interaction material corresponding to the interaction region in a search region may be implemented in the following manner: performing any one of the following processing: alternately displaying interaction materials respectively corresponding to a plurality of interaction regions in the search region; and alternately displaying interaction materials respectively corresponding to the plurality of interaction regions and information materials respectively corresponding to a plurality of pieces of information in the information flow in the search region.

Herein, two display manners in the search region are provided. One manner is to alternately display the interaction materials respectively corresponding to the plurality of interaction regions in the search region. In this way, interaction regions that may be displayed in the information flow region can be effectively prompted. Certainly, when there is only one interaction region, an interaction material corresponding to the interaction region may be continuously displayed. The second manner is to alternately display the interaction materials respectively corresponding to the plurality of interaction regions and the information materials respectively corresponding to the plurality of pieces of information in the information flow in the search region, thereby prompting interaction regions that may be displayed and information that may be displayed in the information flow region.

The plurality of interaction regions herein may only include interaction regions that are being displayed, or may include both the interaction regions that are being displayed and interaction regions are not displayed. Similarly, the plurality of pieces of information in the information flow herein may only include information that is being displayed, or may include both information that is being displayed and information that is not displayed.

Herein, the interaction materials respectively corresponding to the plurality of interaction regions and the information materials respectively corresponding to a plurality of pieces of hot information in the information flow may alternatively be alternately displayed. The hot information is, for example, information with the quantity of comments or the quantity of views in the top M in the information flow, where M is an integer greater than 1.

Step 103: Display, in response to an interaction operation for the interaction region, an interaction process based on the interaction material in the interaction region.

Here, when an interaction operation for the interaction region is received, the interaction process based on the interaction material is displayed in the interaction region. In this way, the user can be effectively attracted in an interaction manner, the user's attention to the information flow can be improved, and the stay duration of the user in the information flow can be lengthened.

In some embodiments, the displaying, in response to an interaction operation for the interaction region, an interaction process based on the interaction material in the interaction region may be implemented in the following manner: receiving the interaction operation for the interaction region, determining interaction response data used for responding to the interaction operation, and displaying the interaction process based on the interaction material in the interaction region according to the interaction response data.

Herein, the interaction response data includes a response result of content in the interaction region for the interaction operation. For example, the content in the interaction region is a gesture interaction type of small game, and the interaction material displayed in the search region is a guide prompt of the small game (that is, a prompt on how to make gestures). When the user performs an interaction operation such as a sliding operation in the interaction region according to the guide prompt, a sliding trajectory of the user's sliding operation is displayed in the interaction region according to the interaction response data; and when the sliding trajectory matches a set trajectory, a result of successful gesture interaction is displayed in the interaction region. Certainly, both the interaction operation and the interaction response data used for responding to the interaction operation may be set according to an actual application scenario, and are not limited to the above examples. In the foregoing manner, accurate positive feedback for the interaction operation can be performed.

In some embodiments, when the interaction process is displayed in the interaction region, the search region may also be enabled to continuously perform synchronous display according to the interaction process in the interaction region. For example, a new interaction material adapted to the interaction process may be obtained, and the new interaction material may be displayed in the search region. In other words, step 103 may be updated to: Display, in response to an interaction operation for the interaction region, an interaction process based on the interaction material in the interaction region, obtain a new interaction material adapted to the interaction process, and display the new interaction material in the search region.

In some embodiments, before step 103, the method further includes: stopping displaying the interaction material in the search region; and displaying a process in which the interaction material moves from the search region to the information flow region and a process in which the interaction material moves from the information flow region to the interaction region. The displaying, in response to an interaction operation for the interaction region, an interaction process based on the interaction material in the interaction region may be implemented in the following manner: displaying, in response to an interaction operation for the interaction material, an interaction process based on the interaction material in the interaction region.

In this embodiment of this application, the interaction experience of the user in the interaction process can be improved by moving the interaction material. For example, when a display duration of the interaction material in the search region reaches a set duration, display of the interaction material in the search region is stopped, and a process in which the interaction material moves from the search region to the information flow region and a process in which the interaction material moves from the information flow region to the interaction region are displayed. The set duration may be set according to an actual application scenario. During the movement of the interaction material, the interaction material can be highlighted in the interface according to parts in the information flow region and the interaction region that are covered by the interaction material and at which the interaction material is located, thereby enhancing the interaction experience.

For the interaction material that has been moved into the interaction region, the user may perform an interaction operation on the interaction material, such as clicking, moving, or long pressing the interaction material. When an interaction operation for the interaction material in the interaction region is received, the interaction process based on the interaction material is displayed in the interaction region. In the foregoing manner, the user's attention to the information flow can be further improved, and the man-machine interaction experience can be effectively enhanced.

In some embodiments, after step 103, the method further includes: caching, in response to an interaction end operation for the interaction region, progress data of the interaction process displayed in the interaction region, and resuming displaying, in response to the interaction operation for the interaction region, a progress of the interaction process in the interaction region according to the cached progress data.

An example form of the interaction end operation for the interaction region is not limited in this embodiment of this application. For example, a start button and an end button are provided in the interaction region, and when the end button is triggered, it is determined that the interaction end operation is received. In another example, when the position of the interaction region in the information flow region is away from the set position, it is determined that the interaction end operation is received. In another example, when a trigger operation for the information in the information flow is received, the trigger operation is determined as an interaction end operation.

Herein, when an interaction end operation is received, progress data of the interaction process displayed in the interaction region is cached. Subsequently, if an interaction operation for the interaction region is received again, the progress of the interaction process resumes to be displayed in the interaction region according to the cached progress data. In the foregoing manner, the progress of the interaction can be saved when the user ends the interaction, which improves the user experience of next interaction, and is applicable to scenarios involving progresses such as a small game.

In some embodiments, after step 103, the method further includes: obtaining a trigger frequency of an interaction operation for the interaction region, and adjusting, according to the trigger frequency, a proportion of the at least one interaction region inserted into the information flow, the proportion of the at least one inserted interaction region being in a positive correlation with the trigger frequency.

In an actual application scenario, some users may not be interested in an inserted interaction region, and the interaction region affects the user browsing information in the information flow. For this case, a trigger frequency (referring to a trigger frequency of an interaction operation) of the interaction region within a set time period (for example, 7 days) is obtained. For example, a trigger record stored in a log of the application is obtained, and the trigger frequency of the interaction region is determined according to the trigger record. The trigger frequency may be obtained separately for different terminal devices, or may be obtained separately for different user accounts of the application. For example, in the latter case, the user accounts of the application include an account A and an account B, then a trigger frequency of the account A for the interaction region within the set time period is obtained separately, and a trigger frequency of the account B for the interaction region within the set time period is obtained separately.

A higher trigger frequency indicates that the user is more interested in the interaction region. Therefore, the proportion of interaction regions inserted in the information flow is adjusted according to the obtained trigger frequency. The proportion of the inserted interaction regions is a ratio of the quantity of the interaction regions to the quantity of pieces of information in the information flow. The proportion is in a positive correlation with the trigger frequency. For example, the trigger frequency of the account A is higher than that of the account B, so that in an information flow region of an application logged in with the account A, the proportion of inserted interaction regions is also higher (compared with that of an application logged in with the account B). In the foregoing manner, the proportion of the inserted interaction regions can be adjusted according to interests of different users, to meet the preferences of different users.

As shown in FIG. 5A, in this embodiment of this application, by inserting at least one interaction region into the information flow, the user can smoothly participate in the interaction in the process of browsing the information flow, which improves the efficiency of participating in the interaction. Moreover, by displaying the interaction material in the search region, the user can better perform interaction according to the interaction material, which lengthens the stay duration of the user in the information flow and improves the man-machine interaction experience, and can also increase the actual utilization of computing resources consumed by the electronic device for display (for example, displaying an information flow).

Figure 5B:
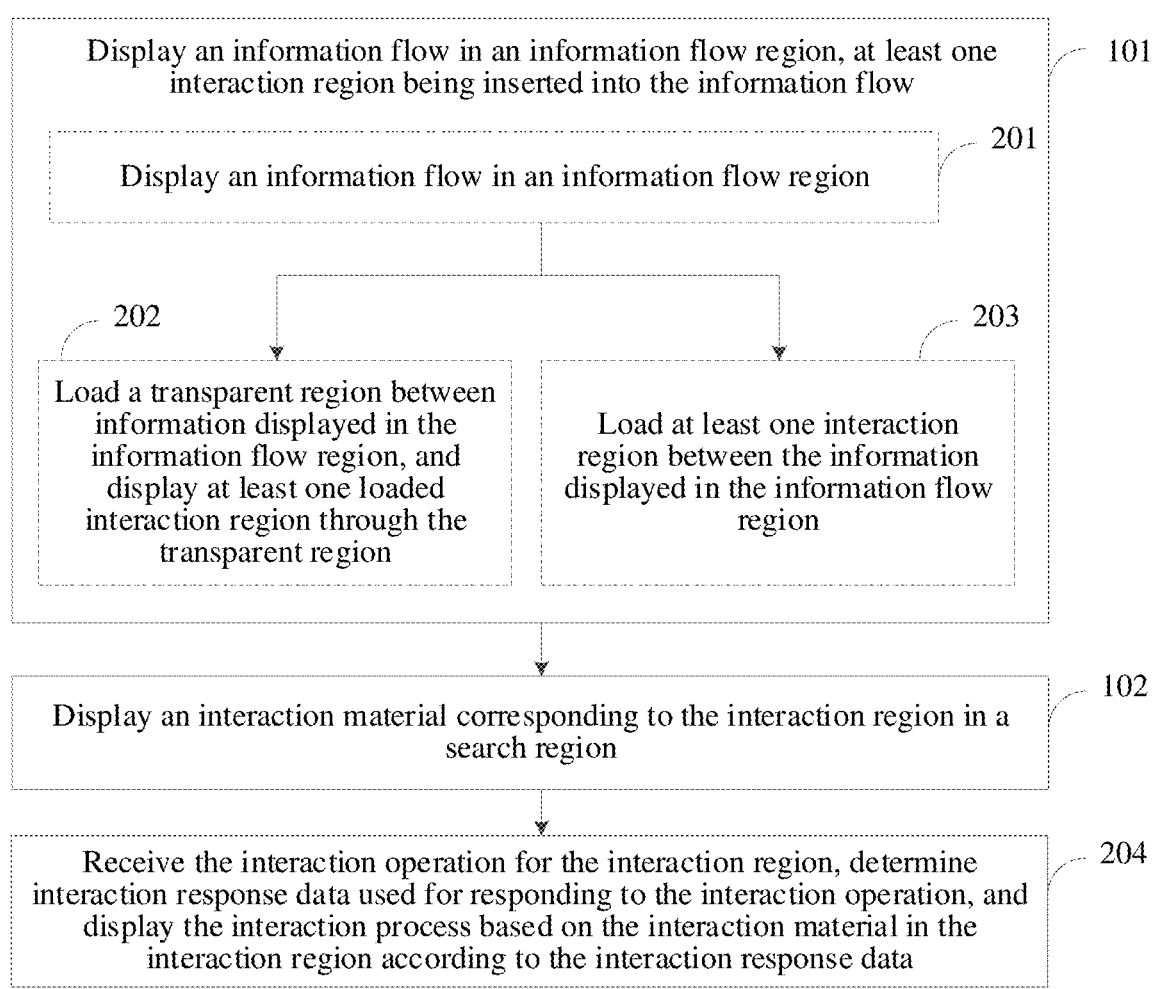

In some embodiments, FIG. 5B is a schematic flowchart of an interaction processing method for an information flow according to an embodiment of this application. Step 101 shown in FIG. 5A may be implemented through step 201 and step 202, or through step 201 and step 203. A description is made with reference to the steps.

Step 201: Display an information flow in an information flow region.

In this step, no interaction region is inserted into the displayed information flow.

Step 202: Load a transparent region between information displayed in the information flow region, and display at least one loaded interaction region through the transparent region.

This embodiment of this application provides two manners of inserting an interaction region into the information flow. One manner is to load a transparent region configured for avoiding an interaction region between the information in the information flow region, so that the at least one loaded interaction region is displayed through the transparent region. This manner is similar to hollowing out, that is, hollowing out a part of the information flow region to display the interaction region.

Step 203: Load at least one interaction region between the information displayed in the information flow region.

The other manner is to directly load at least one interaction region between the information displayed in the information flow region. This manner is similar to reorganizing the information flow region to load an interaction region meeting a size of the information flow region in the information flow region. According to different actual application scenarios, any one of the foregoing two manners may be applied to realize insertion of an interaction region.

In FIG. 5B, step 103 shown in FIG. 5A may be updated to step 204. Step 204: Receive the interaction operation for the interaction region, determine interaction response data used for responding to the interaction operation, and display the interaction process based on the interaction material in the interaction region according to the interaction response data.

Herein, the interaction response data includes a response result of the content in the interaction region for the interaction operation. For example, when the content in the interaction region is a small game, the interaction response data may be data for controlling the user's score displayed in the small game, and when the content in the interaction region is video live streaming, the interaction response data may be data for controlling special effects of gifts displayed in the video live streaming. The interaction process based on the interaction material may be refreshed and displayed in the interaction region according to the determined interaction response data.

In this embodiment of this application, trigger operations for regions other than the interaction region may further be received. For ease of distinction, trigger operations for the information flow region are named information flow region operations, and trigger operations for the search region are named search region operations. The information flow region operation is used as an example. When an information flow region operation is received, the information flow region operation is processed to obtain information flow region response data, and the information flow region is refreshed and displayed according to the information flow region response data. The information flow region response data may be used to control a change of a display form of the information in the information flow, such as displaying (for example, jumping to) a detail interface of a certain piece of information or adding comment content to a certain piece of information, which depends on the information flow region operation in one example. In addition, the response of the information flow framework layer according to the information flow region operation is irrelevant to the insertion manner of the interaction region. The search region operation is similar to the information flow region operation.

As shown in FIG. 5B, this embodiment of this application provides two manners of inserting an interaction region, which improves the flexibility of interaction processing.

Figure 5C:
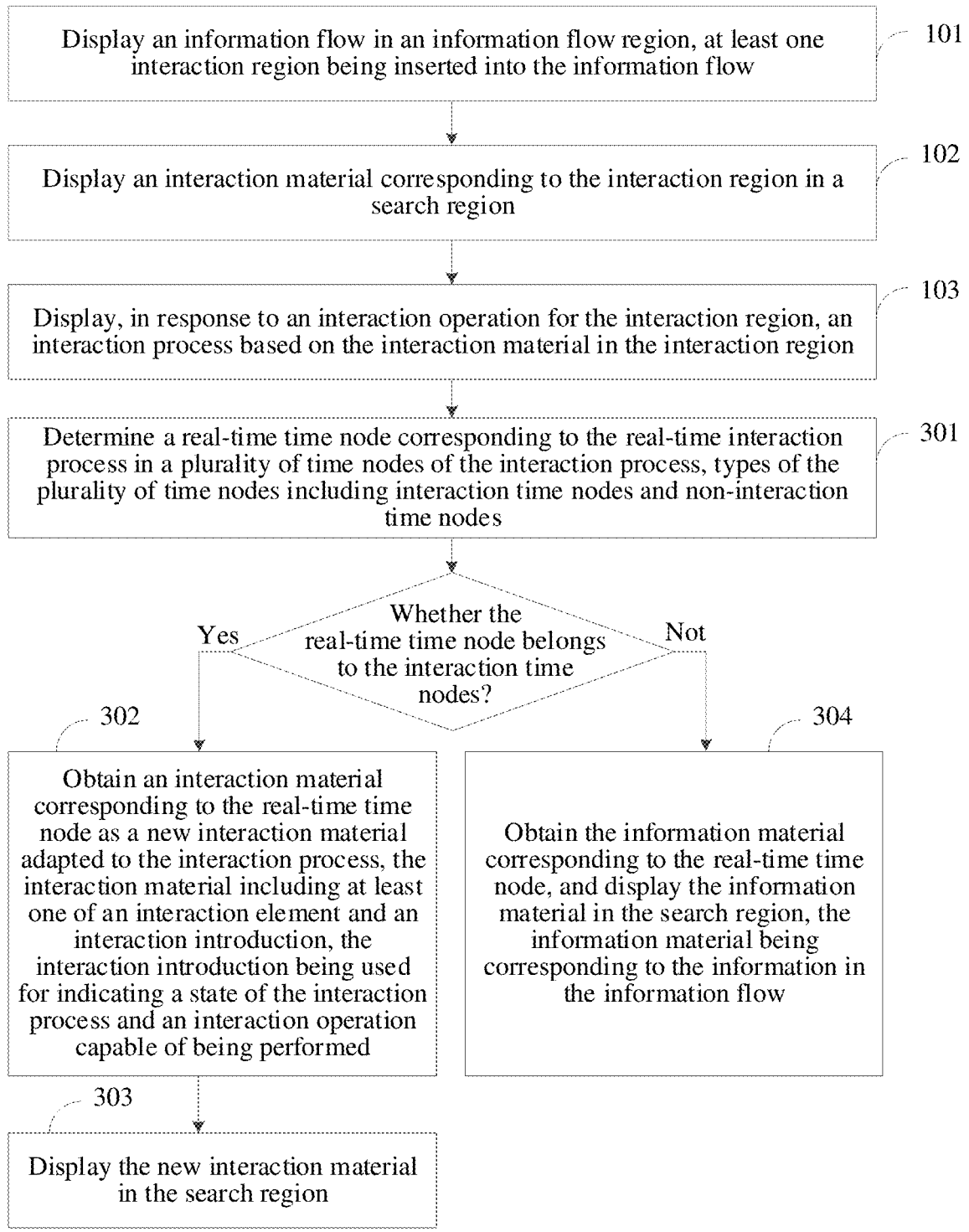

In some embodiments, FIG. 5C is a schematic flowchart of an interaction processing method for an information flow according to an embodiment of this application. When the interaction process based on the interaction material is displayed in the interaction region, step 301 to step 303 may further be performed. A description is made with reference to the steps.

Step 301: Determine a real-time time node corresponding to the real-time interaction process in a plurality of time nodes of the interaction process, types of the plurality of time nodes including interaction time nodes and non-interaction time nodes.

Herein, for the interaction process, a plurality of time nodes are preset, and types of the plurality of time nodes include interaction time nodes and non-interaction time nodes, the interaction time nodes being corresponding to interaction materials, and the non-interaction time nodes being corresponding to information materials. In addition, interaction materials corresponding to different interaction time nodes may be the same or different, and information materials corresponding to different non-interaction time nodes may be the same or different, which may be set according to an actual application scenario. A setting manner of time nodes is not limited in this embodiment of this application. For example, all time nodes may be set to be interaction time nodes, or the time nodes may be set to include interaction time nodes and non-interaction time nodes. For example, when the content in the interaction region is a small game, the time nodes may be set to include the $10^{th}$ second, the $20^{th}$ second, and the $30^{th}$ second from the start of the small game, and all the time nodes are interaction time nodes. Only interaction time nodes may be set, and time nodes other than the interaction time nodes are all determined as non-interaction time nodes. In addition, in this embodiment of this application, discrete time nodes may alternatively be combined to obtain continuous time stages. That is, a plurality of time stages are set, and types of the time stages include interaction time stages and non-interaction time stages, the interaction time stages being corresponding to interaction materials, and the non-interaction time stages being corresponding to information materials. On this basis, time nodes and time stages may also be mixedly set. This is not limited in this embodiment of this application.

A real-time time node corresponding to the real-time interaction process is determined in a plurality of preset time nodes. For a case in which all the time nodes are interaction time nodes, after the real-time time node is determined, an interaction material corresponding to the real-time time node is directly determined as a new interaction material adapted to the interaction process. For a case in which the time nodes include interaction time nodes and non-interaction time nodes, after the real-time time node is determined, the type of the real-time time node is first determined, and then subsequent steps are performed according to the determination result.

Step 302: Obtain, when the real-time time node belongs to the interaction time nodes, the interaction material corresponding to the real-time time node as a new interaction material adapted to the interaction process, the interaction material including at least one of an interaction element and an interaction introduction, the interaction introduction being used for indicating a state of the interaction process and an interaction operation capable of being performed.

For example, if the real-time time node belongs to the interaction time nodes, an interaction material corresponding to the real-time time node is determined from interaction materials respectively corresponding to all the interaction time nodes as a new interaction material adapted to the interaction process. The interaction material includes at least one of an interaction element and an interaction introduction, where the interaction element refers to any visual object participating in a man-machine interaction operation in an interaction process, which can change a position and/or display effects thereof according to the man-machine interaction operation; and the interaction introduction is used for indicating a state of the interaction process and an interaction operation capable of being performed, and may be displayed in the search region.

Step 303: Display the new interaction material in the search region.

For example, after the new interaction material is obtained, the new interaction material may be displayed in the search region.

In FIG. 5C, after step 301, in step 304, when the real-time time node belongs to the non-interaction time nodes, the information material corresponding to the real-time time node may also be obtained, and the information material is displayed in the search region, the information material being corresponding to the information in the information flow.

For example, if the real-time time node belongs to the non-interaction time nodes, the information material corresponding to the real-time time node is determined from the information materials respectively corresponding to all the non-interaction time nodes, and the determined information material is displayed in the search region.

As shown in FIG. 5C, in this embodiment of this application, by determining the real-time time node of the real-time interaction process, the search region can accurately display a material (interaction material or information material) corresponding to the real-time interaction process, which improves accuracy and timeliness of the display.

Figure 5D:
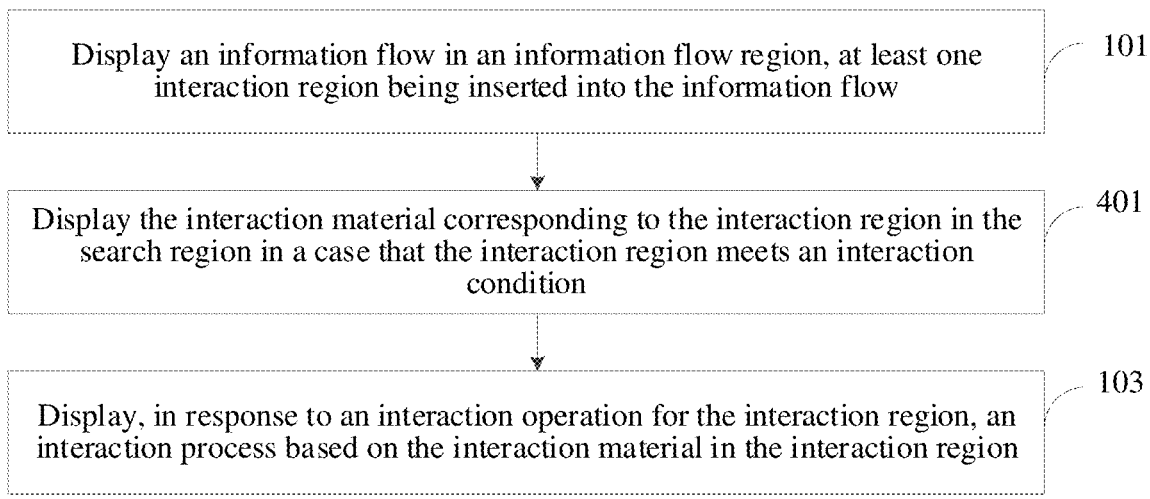

In some embodiments, FIG. 5D is a schematic flowchart of an interaction processing method for an information flow according to an embodiment of this application. Step 102 shown in FIG. 5A may be updated to step 401.

Step 401: Display the interaction material corresponding to the interaction region in the search region when the interaction region meets an interaction condition.

Herein, the interaction condition includes at least one of the following: a position of the interaction region in the information flow region being at a set position; a stay duration of the interaction region in the information flow region being greater than a duration threshold; and a last piece of information displayed in the interaction region being separated by K pieces of information from a last piece of information displayed in the information flow region, K being a non-negative integer.

A case in which the interaction condition includes that a position of the interaction region in the information flow region is at a set position is used as an example. The type of the set position may vary in different examples. The set position may be a certain fixed position, such as a lower boundary of the information flow region, a middle position between an upper boundary and the lower boundary of the information flow region, or a middle position between a left boundary and a right boundary of the information flow region. The set position may alternatively be a position range. For example, after the middle position between the upper boundary and the lower boundary of the information flow region is obtained, all positions within a range from the middle position to the upper boundary are used as the set position; and the set position may alternatively include all positions in the information flow region, that is, provided that the interaction region appears in the information flow region, it is determined that the position of the interaction region is at the set position. The interaction material corresponding to the interaction region may be displayed in the search region when the position of the interaction region in the information flow region is at the set position.

In some embodiments, when the interaction condition includes that the position of the interaction region in the information flow region is at the set position, after step 401, the method further includes: stopping displaying the interaction material corresponding to the interaction region in the search region when the position of the interaction region in the information flow region is away from the set position.

As shown in FIG. 5D, in this embodiment of this application, the interaction condition may be determined according to an actual application scenario, which can improve the flexibility of the timing for displaying the interaction material. For example, the set position may be set to a position that the user can pay attention to more easily in the information flow region, so as to better attract the user for interaction.

Figure 5E:
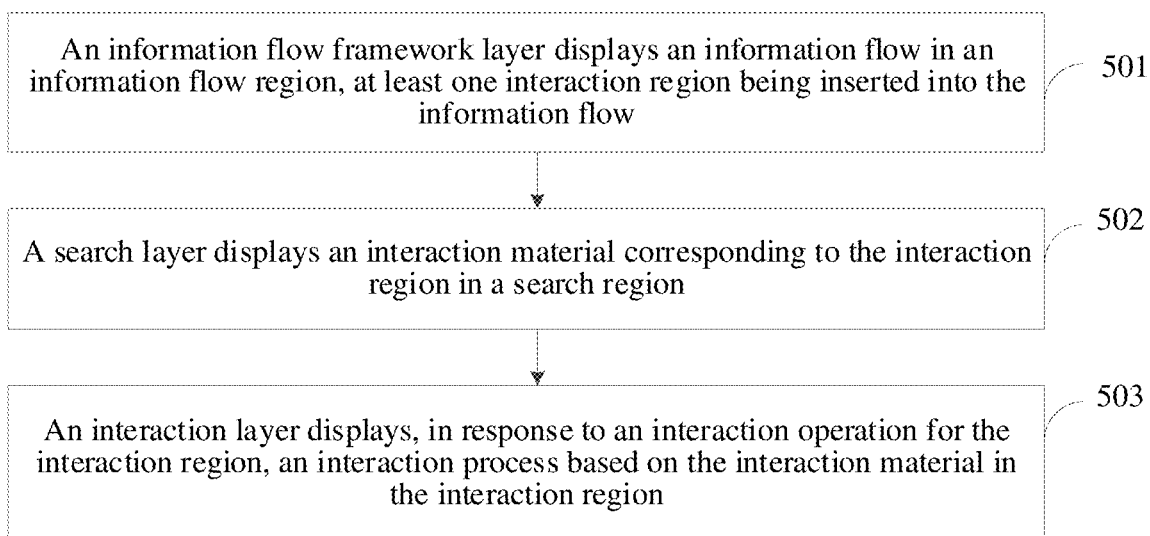

In some embodiments, FIG. 5E is a schematic flowchart of an interaction processing method for an information flow according to an embodiment of this application. Step 101 shown in FIG. 5A may be updated to step 501. Step 501: An information flow framework layer displays an information flow in an information flow region, at least one interaction region being inserted into the information flow.

Herein, the interface view of the application may include an information flow framework layer, a search layer and an interaction layer. For example, a first application and a second application are run in an electronic device (such as a terminal device), the first application is used for providing an information flow, and the second application is used for providing an interaction function, then an interface view of the first application may include an information flow framework layer and a search layer, and the interface view of the second application may include an interaction layer. The information flow framework layer may be configured for displaying an information flow in a set information flow region.

A description is made by using an example with reference to architectures of applications shown in FIG. 4A and FIG. 4B. In response to an operation for opening or refreshing the information flow region, the information flow framework layer sends the information flow region operation to a corresponding controller (for example, an information flow framework layer controller) in the form of an event. The controller sends the information flow region operation to a corresponding model (for example, an information flow framework layer model), and the model determines a to-be-displayed information flow according to the information flow region operation. Herein, the model may screen a to-be-displayed information flow screened from a plurality of pieces of information stored locally on the terminal device (certainly, the screening may be skipped, and the plurality of pieces of local information are directly used as the to-be-displayed information flow), or may send the information flow region operation to the server, and obtain a to-be-displayed information flow fed back by the server. After determining the to-be-displayed information flow, the model sends the information flow to the information flow framework layer, so that the information flow framework layer displays the information flow in the information flow region.

In some embodiments, after step 501, the method further includes: updating, by the information flow framework layer in response to a movement operation for the information flow, a position of information in the information flow in the information flow region and a position of the interaction region in the information flow region.

In FIG. 5E, step 102 shown in FIG. 5A may be updated to step 502. Step 502: The search layer displays an interaction material corresponding to the interaction region in a search region.

A description is made by using an example with reference to architectures of applications shown in FIG. 4A and FIG. 4B. The interaction layer obtains the interaction material from a corresponding model (for example, an interaction layer model) by using a corresponding controller (for example, an interaction layer controller), and sends the interaction material to the search layer through the information flow framework layer, so that the search layer displays the interaction material in the search region. Certainly, the search layer may alternatively obtain the interaction material from a corresponding model (for example, a search layer model) by using a controller corresponding to the search layer (for example, a search layer controller).

In some embodiments, between any steps, the method further includes: receiving, by the search layer, a keyword entered in the search region; and searching the information flow for information matching the keyword, and displaying a detail interface corresponding to the information matching the keyword.

Herein, after the search region is displayed, the search layer may receive the keyword entered in the search region, and send the keyword in the form of an event to the corresponding model (for example, the search layer model) by using the corresponding controller (for example, the search layer controller). The model searches the information flow for information matching the received keyword, and feeds relevant data (for example, a link) of a detail interface corresponding to the information matching the keyword back to the search layer. The search layer may send relevant data to the information flow framework layer, so that the information flow framework layer displays, according to the relevant data, the detail interface corresponding to the information matching the keyword. Certainly, when the search layer has a display function, the search layer may also display, according to the relevant data, the detail interface corresponding to the information matching the keyword.

In addition to querying the information flow for the information matching the keyword, the model corresponding to the search layer may also access the backend, so as to find the information matching the keyword in the information at the backend. In addition, a matching manner is not limited in this embodiment of this application. For example, if a certain piece of information includes the keyword, it is considered that the information matches the keyword. In the foregoing manner, in addition to displaying the interaction material in the search region, the search layer may further provide an information query function, which improves the diversity at the functional level.

In some embodiments, that the search layer displays an interaction material corresponding to the interaction region in a search region may be implemented in the following manner: performing any one of the following processing: alternately displaying, by the search layer, interaction materials respectively corresponding to a plurality of interaction regions in the search region; and alternately displaying, by the search layer, interaction materials respectively corresponding to the plurality of interaction regions and information materials respectively corresponding to a plurality of pieces of information in the information flow in the search region.

In some embodiments, that the search layer displays an interaction material corresponding to the interaction region in a search region may be implemented in the following manner: transmitting, by the interaction layer, the interaction material corresponding to the interaction region to the information flow framework layer; transmitting, by the information flow framework layer, the received interaction material to the search layer; and displaying, by the search layer, the received interaction material in the search region.

For a possible case in which the interaction layer and the search layer cannot communicate with each other, after obtaining the interaction material, the interaction layer sends the interaction material to the information flow framework layer. The information flow framework layer sends the received interaction material to the search layer, so that the search layer displays the interaction material in the search region. In the foregoing manner, the effectiveness of data communication and the applicability to actual application scenarios are improved. The foregoing manner is also applicable to displaying a new interaction material adapted to the interaction process.

In FIG. 5E, step 103 shown in FIG. 5A may be updated to step 503. Step 503: The interaction layer displays, in response to an interaction operation for the interaction region, an interaction process based on the interaction material in the interaction region.

In some embodiments, that the interaction layer displays, in response to an interaction operation for the interaction region, an interaction process based on the interaction material in the interaction region may be implemented in the following manner: receiving, by the interaction layer, the interaction operation for the interaction region, determining interaction response data used for responding to the interaction operation, and displaying the interaction process based on the interaction material in the interaction region according to the interaction response data.

Herein, the interaction layer displays, in response to an interaction operation for the interaction region (which is also referred to as an interaction region operation), the interaction process based on the interaction material in the interaction region. For example, the information flow framework layer may send the received interaction operation to the interaction layer, and the interaction layer sends the received interaction operation in the form of an event to the corresponding model by using the controller corresponding to the interaction layer. After processing, the model returns the interaction response data (interaction region response data) to the interaction layer by using the controller, and the interaction layer refreshes content in the interaction region according to the interaction response data, that is, displays the interaction process based on the interaction material.

In some embodiments, when the interaction layer displays the interaction process in the interaction region, the search region may also be enabled to continuously perform synchronous display according to the interaction process in the interaction region. For example, the interaction layer may obtain a new interaction material adapted to the interaction process, and notify the search region to display the new interaction material. In other words, step 503 may be updated to: The interaction layer displays, in response to an interaction operation for the interaction region, an interaction process based on the interaction material in the interaction region, obtains a new interaction material adapted to the interaction process, and notifies the search region to display the new interaction material. For example, the interaction layer obtains a new interaction material from the corresponding model by using the corresponding controller.

In some embodiments, before step 503, the method further includes: stopping, by the search layer, displaying the interaction material in the search region; and displaying, by the information flow framework layer, a process in which the interaction material moves from the search region to the information flow region and a process in which the interaction material moves from the information flow region to the interaction region. That the interaction layer displays, in response to an interaction operation for the interaction region, an interaction process based on the interaction material in the interaction region may be implemented in the following manner: displaying, by the interaction layer in response to an interaction operation for the interaction material, the interaction process based on the interaction material in the interaction region.

In this embodiment of this application, the interaction experience of the user in the interaction process can be improved by moving the interaction material. For example, when a duration of displaying the interaction material in the search region by the search layer reaches a set duration, the search layer stops displaying the interaction material in the search region, and the information flow framework layer displays a process in which the interaction material moves from the search region to the information flow region and a process in which the interaction material moves from the information flow region to the interaction region. The set duration may be set according to an actual application scenario in one example. During the movement of the interaction material, the interaction material can be highlighted in the interface according to parts in the information flow region and the interaction region that are covered by the interaction material and at which the interaction material is located, thereby enhancing the interaction experience.

For the interaction material that has been moved into the interaction region, the user may perform an interaction operation on the interaction material, such as clicking, moving, or long pressing the interaction material. The interaction layer displays, in response to an interaction operation for the interaction material in the interaction region, the interaction process based on the interaction material in the interaction region. In the foregoing manner, the user's attention to the information flow can be further improved, and the man-machine interaction experience can be effectively enhanced.

In some embodiments, after step 503, the method further includes: caching, by the interaction layer in response to an interaction end operation for the interaction region, progress data of the interaction process displayed in the interaction region, and resuming displaying, in response to the interaction operation for the interaction region, a progress of the interaction process in the interaction region according to the cached progress data.

Herein, the interaction end operation may be sent by the information flow framework layer to the interaction layer, and the interaction layer caches, in response to the interaction end operation, the progress data of the interaction process displayed in the interaction region. If the interaction layer receives an interaction operation for the interaction region again, the interaction layer resumes displaying the progress of the interaction process in the interaction region according to the cached progress data. In the foregoing manner, the progress of the interaction can be saved when the user ends the interaction, which improves the user experience of next interaction, and is applicable to scenarios such as a small game.

In some embodiments, after step 503, the method further includes: obtaining, by the information flow framework layer, a trigger frequency of an interaction operation for the interaction region, and adjusting, according to the trigger frequency, a proportion of the at least one interaction region inserted into the information flow, the proportion of the at least one inserted interaction region being in a positive correlation with the trigger frequency.

As shown in FIG. 5E, in this embodiment of this application, accurate and effective interaction processing can be achieved through the cooperation of the information flow framework layer, the search layer, and the interaction layer.

Figure 5F:
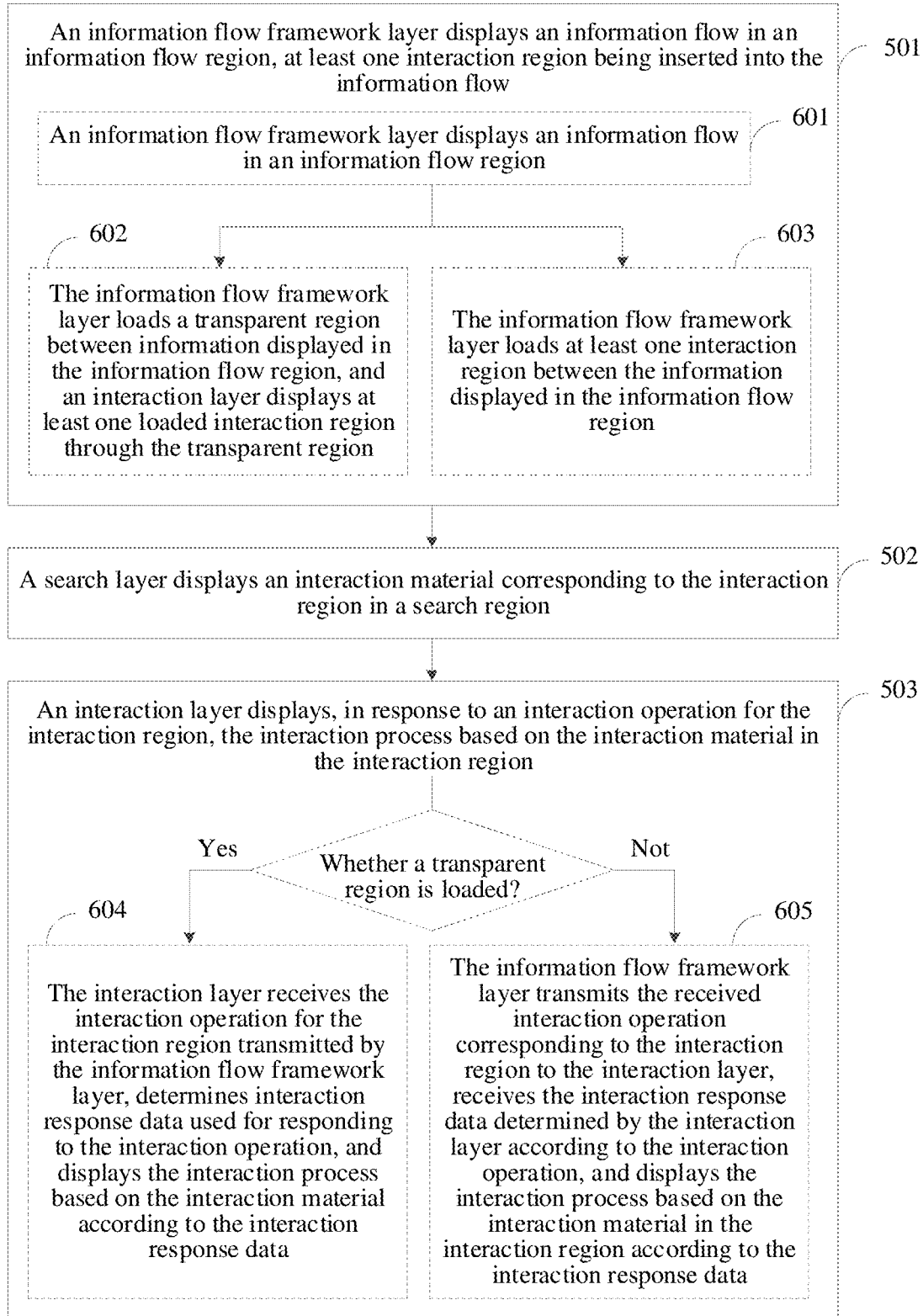

In some embodiments, FIG. 5F is a schematic flowchart of an interaction processing method for an information flow according to an embodiment of this application. Step 501 shown in FIG. 5E may be implemented through step 601 and step 602, or through step 601 and step 603. A description is made with reference to the steps.

Step 601: An information flow framework layer displays an information flow in an information flow region.

In this step, no interaction region is inserted into the displayed information flow.

Step 602: The information flow framework layer loads a transparent region between information displayed in the information flow region, and an interaction layer displays at least one loaded interaction region through the transparent region.

Herein, one manner of inserting the interaction region is that the information flow framework layer loads a transparent region configured for avoiding an interaction region between the information in the information flow region, so that the at least one interaction region loaded by the interaction layer is displayed through the transparent region. This manner is similar to hollowing out, that is, hollowing out a part of the information flow region to display the interaction region.

Step 603: The information flow framework layer loads at least one interaction region between the information displayed in the information flow region.

The other manner is that the information flow framework layer obtains relevant data of the interaction region (interaction region response data) from the interaction layer, and loads, according to the obtained relevant data, at least one interaction region between the information displayed in the information flow region. This manner is similar to that the information flow framework layer reorganizes the interaction regions of the interaction layer, to load an interaction region meeting a size of the information flow region in the information flow region. According to different actual application scenarios, any one of the foregoing two manners may be applied to realize insertion of an interaction region.

In FIG. 5F, step 503 shown in FIG. 5E may be implemented through step 604 or step 605. A description is made with reference to the steps.

Step 604: When a transparent region corresponding to the interaction region is loaded by the information flow framework layer in the information flow region, the interaction layer receives the interaction operation for the interaction region transmitted by the information flow framework layer, determines the interaction response data used for responding to the interaction operation, and displays the interaction process based on the interaction material according to the interaction response data.

Corresponding to the manner of step 602, when receiving the interaction operation for the interaction region, the information flow framework layer sends the interaction operation to the interaction layer. The interaction layer sends the interaction operation in the form of an event to a corresponding model by using a corresponding controller. The model obtains the interaction response data through processing, and returns the interaction response data to the interaction layer through the controller. The interaction layer refreshes, according to the interaction response data, the interaction process displayed in the interaction region. The interaction response data includes a response result of the content in the interaction region for the interaction operation. For example, when the content in the interaction region is a small game, the interaction response data may be data for controlling the user's score displayed in the small game, and when the content in the interaction region is video live streaming, the interaction response data may be data for controlling special effects of gifts displayed in the video live streaming.

Step 605: When the interaction region is loaded by the information flow framework layer in the information flow region, the information flow framework layer transmits the received interaction operation corresponding to the interaction region to the interaction layer, receives the interaction response data determined by the interaction layer according to the interaction operation, and displays the interaction process based on the interaction material in the interaction region according to the interaction response data.

Corresponding to the manner in step 603, when receiving the interaction operation for the interaction region, the information flow framework layer sends the interaction operation to the interaction layer; and after performing a series of processing according to the interaction operation to obtain the interaction response data, the interaction layer sends the interaction response data to the information flow framework layer. In this way, the information flow framework layer may refresh and display the interaction process based on the interaction material in the interaction region according to the interaction response data.

The information flow framework layer may further receive trigger operations for regions other than the interaction region. For ease of distinction, trigger operations for the information flow region are named information flow region operations. When receiving an information flow region operation, the information flow framework layer sends the information flow region operation in the form of an event to the corresponding model through the corresponding controller. The model obtains information flow region response data through processing, and returns the information flow region response data to the information flow framework layer through the controller. The information flow framework layer refreshes and displays the information flow region according to the obtained information flow region response data. The information flow region response data may be used to control a change of a display form of the information in the information flow, such as displaying (for example, jumping to) a detail interface of a certain piece of information or adding comment content to a certain piece of information, which may depend on the specific information flow region operation in some examples. In addition, the response of the information flow framework layer according to the information flow region operation is irrelevant to the insertion manner of the interaction region.

As shown in FIG. 5F, this embodiment of this application provides two manners of inserting an interaction region, and the flexibility of interaction processing is improved for an interaction process based on an interaction material in each manner.

Figure 5G:
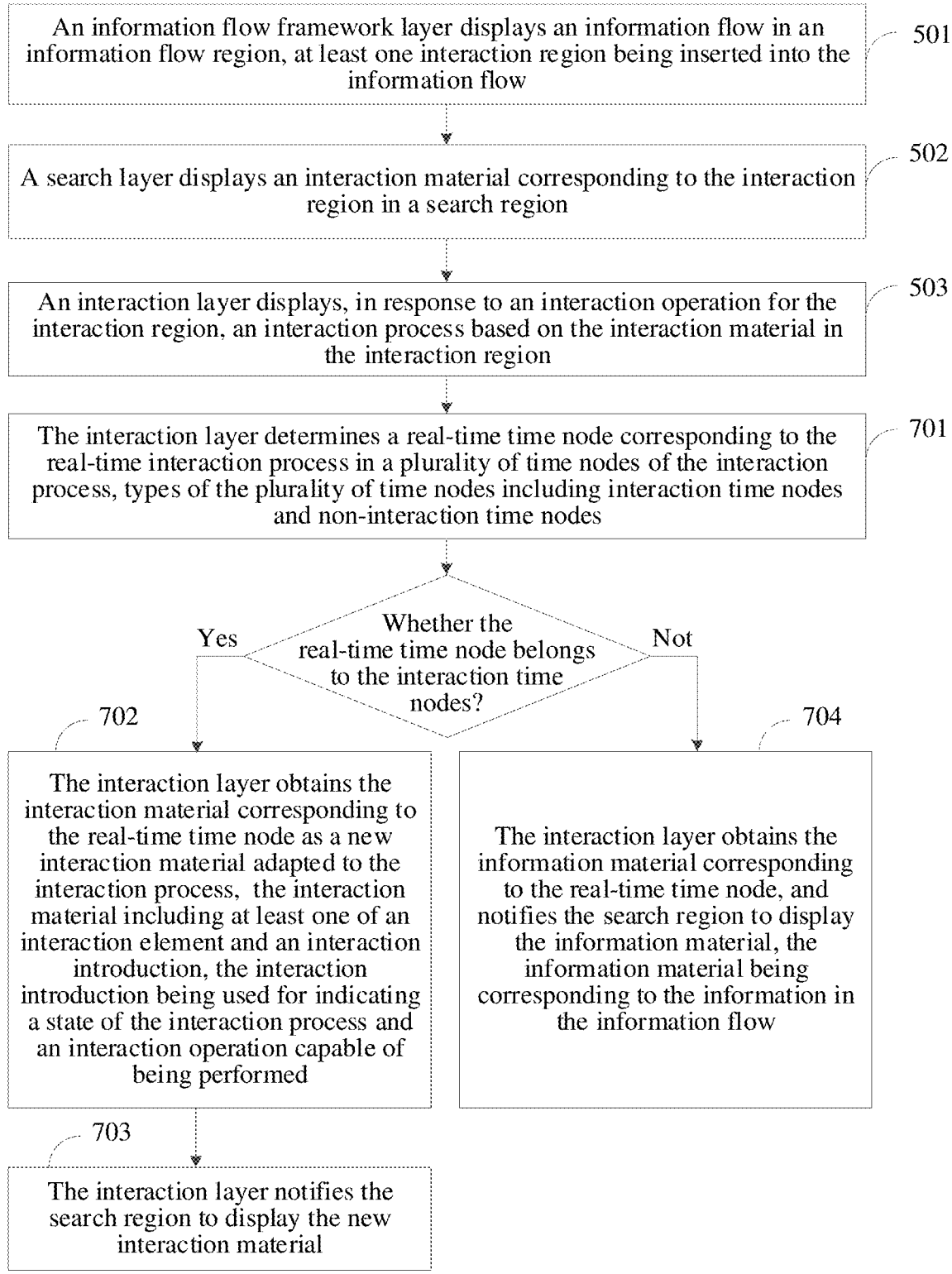

In some embodiments, FIG. 5G is a schematic flowchart of an interaction processing method for an information flow according to an embodiment of this application. When the interaction process based on the interaction material is displayed in the interaction region, step 701 to step 703 may further be performed. A description is made with reference to the steps.

Step 701: The interaction layer determines a real-time time node corresponding to the real-time interaction process in a plurality of time nodes of the interaction process, types of the plurality of time nodes including interaction time nodes and non-interaction time nodes.

For example, the interaction layer sends data of the real-time interaction process in the form of an event to the corresponding model through the corresponding controller, and the model determines the real-time time node. For a case in which all the time nodes are interaction time nodes, after the real-time time node is determined, an interaction material corresponding to the real-time time node is directly determined as a new interaction material adapted to the interaction process. For a case in which the time nodes include interaction time nodes and non-interaction time nodes, after the real-time time node is determined, the type of the real-time time node is first determined, and then subsequent steps are performed according to the determination result.

Step 702: The interaction layer obtains, when the real-time time node belongs to the interaction time nodes, the interaction material corresponding to the real-time time node as a new interaction material adapted to the interaction process, the interaction material including at least one of an interaction element and an interaction introduction, the interaction introduction being used for indicating a state of the interaction process and an interaction operation capable of being performed.

For example, if the real-time time node belongs to the interaction time nodes, the model corresponding to the interaction layer determines an interaction material corresponding to the real-time time node from interaction materials respectively corresponding to all the interaction time nodes as a new interaction material adapted to the interaction process, and returns the new interaction material to the interaction layer by using the controller.

Step 703: The interaction layer notifies the search region to display the new interaction material.

For example, the interaction layer sends the new interaction material to the search layer through the information flow framework layer, so that the search layer displays the new interaction material in the search region.

In FIG. 5G, after step 701, in step 704, when the real-time time node belongs to the non-interaction time nodes, the interaction layer may further obtain the information material corresponding to the real-time time node, and notify the search region to display the information material, the information material being corresponding to the information in the information flow.

For example, if the real-time time node belongs to the non-interaction time nodes, the model corresponding to the interaction layer determines the information material corresponding to the real-time time node from the information materials respectively corresponding to all the non-interaction time nodes, and returns the information material to the interaction layer through the controller. The interaction layer notifies the search region to display the information material.

As shown in FIG. 5G, in this embodiment of this application, by determining the real-time time node of the real-time interaction process, the search region can accurately display a material corresponding to the real-time interaction process, which improves accuracy and timeliness of the display.

Figure 5H:
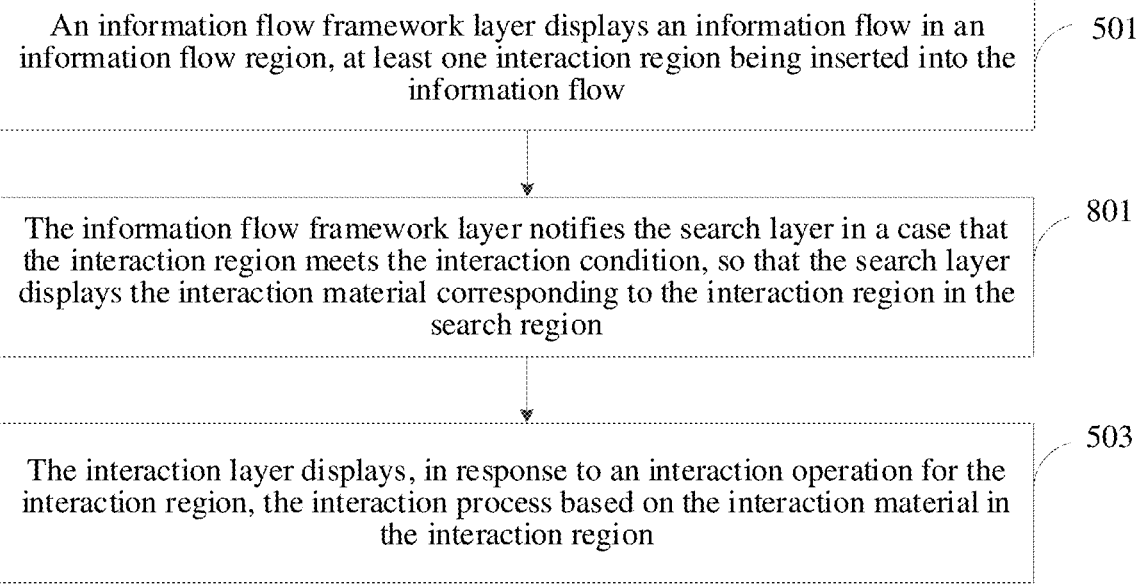

In some embodiments, FIG. 5H is a schematic flowchart of an interaction processing method for an information flow according to an embodiment of this application. Step 502 shown in FIG. 5E may be updated to step 801. Step 801: The information flow framework layer notifies the search layer when the interaction region meets the interaction condition, so that the search layer displays the interaction material corresponding to the interaction region in the search region.

Herein, the information flow framework layer may determine whether the interaction region meets the interaction condition. When the interaction region meets the interaction condition, the information flow framework layer notifies the search layer, so that the search layer displays the interaction material corresponding to the interaction region in the search region.

For example, the information flow framework layer may send an event that the interaction region is at a set position to the search layer, and the search layer sends the event to the corresponding model by using the controller corresponding to the search layer. After obtaining the search region response data through processing, the model returns the search region response data to the search layer through the controller, and the search layer executes the search region response data. The search region response data herein is used for determining to display the interaction material corresponding to the interaction region in the search region. Certainly, the information flow framework layer may alternatively send the event that the interaction region is at the set position to the interaction layer, and after the interaction layer obtains the interaction material, the search layer is notified to display the interaction material.

In some embodiments, when the interaction condition includes that the position of the interaction region in the information flow region is at the set position, after step 801, the method further includes: when the position of the interaction region in the information flow region is away from the set position, notifying, by the information flow framework layer, the search layer, so that the search layer stops displaying the interaction material corresponding to the interaction region in the search region.

For example, when the position of the interaction region in the information flow region is away from the set position, the information flow framework layer sends the received event to the search layer, and the search layer obtains the search region response data after model processing, and executes the search region response data. The search region response data herein is used for determining to stop displaying the interaction material corresponding to the interaction region in the search region.

As shown in FIG. 5H, this embodiment of this application can improve the flexibility of the timing of displaying the interaction material, that is, the interaction condition can be freely set according to an actual application scenario.

The following describes an example application of this embodiment of this application in an actual application scenario. An interface of an information application (corresponding to the foregoing first application) is used as an example for description. A search box (corresponding to the foregoing search region) may be set at the top of the interface, and below the search box is the information flow region. The information flow region is configured for displaying an information flow. Information in the information flow may be presented in a tabular structure. The tabular structure of one piece of information may include the following elements: a title, an accompanying picture (big picture, double picture, triple picture, multi-picture, or the like), a source, a negative feedback, a button, and the like. The big picture is a form of the accompanying picture in the tabular structure, which means that only one picture is displayed in the information, and a size and a specification of the picture are determined according to size requirements of different platforms.

The form of the big picture is used as an example. In this embodiment of this application, interactive content is embedded below the big picture region (corresponding to the foregoing interaction region) to form a piece of special information, and the interactive content may be provided by the second application. When it is detected that the user slides to the special information in the process of browsing the information flow (that is, the special information meets the interaction condition), a linkage state with the search box is activated. In the linkage state, if it is detected that the user has performed some operations (that is, interaction operations) on the special information, corresponding information, animation, special effect feedback, or the like (corresponding to the foregoing interaction material) is displayed in the search box. The interactive content includes, but not limited to, a small game, a short video, live streaming, and an advertisement.

Figure 6:
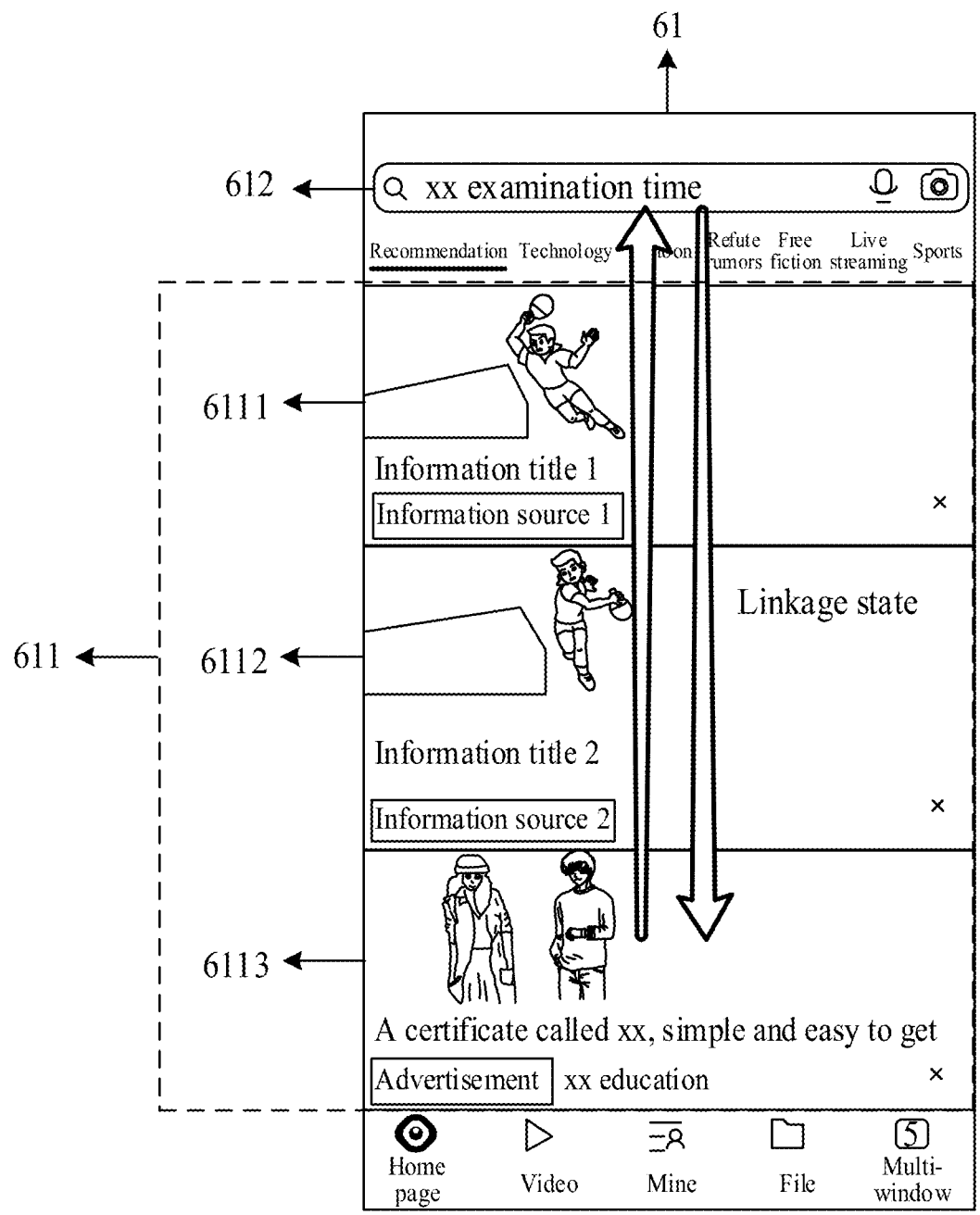
FIG. 6 to FIG. 8 are schematic diagrams of interfaces of applications according to an embodiment of this application.

For example, an embodiment of this application provides a schematic diagram of an application interface shown in FIG. 6. In a recommendation interface 61 of the application shown in FIG. 6, an information flow region 611 and a search box 612 are displayed. The information flow in the information flow region 611 includes information 6111 and information 6112, and the information flow region 611 further includes special information 6113 embedded with interactive content. The interactive content is an advertisement, and a title of the advertisement is "A certificate called xx, simple and easy to get". In the recommendation interface 61, the linkage state has been activated. That is, the copywriting, namely, "xx examination time" corresponding to the advertisement in the special information 6113 is displayed in the search box 612. In this way, the content displayed in the search box can enhance the interaction experience of the user interacting with the special information.

In this embodiment of this application, an example in which a small game is embedded into the big picture region to obtain special information is also used. For the convenience of distinction, the special information is named as small game information. In the process of browsing the information flow by the user, if it is detected that the small game information has been slid to a set base point (corresponding to the foregoing set position), an interaction material corresponding to the small game is displayed in the search box. The type of the interaction material includes a game element (corresponding to the foregoing interaction element) and game copywriting (corresponding to the foregoing interaction introduction). The game copywriting can be used for indicating a state of the small game and an operation that can be performed. For example, the game copywriting may be a prompt, guidance, or an annotation, such as a prompt for the start of the small game. The game element may be, for example, a game prop. The base point may be a specific position or a position range. When a game element appears in the search box, the game element is displayed in the search box for n seconds (corresponding to the foregoing set duration), and then drops down from the search box until dropping into the big picture region, where n is a number greater than 0. The user may trigger a game element in the big picture region. For example, when an operation such as a click or a long press on a game element in the big picture region is detected, the game element may be eliminated to realize a new form of an information flow small game. When it is detected that the user controls the small game information to be away from the base point, the state of the search box is restored to an original state, such as a state of alternately displaying information materials of hot information in the information flow. Herein, the hot information is, for example, information with the quantity of comments or the quantity of views in the top M in the information flow, where M is an integer greater than 1. The information material is, for example, an information title of the hot information. In this way, the small game is fused into the from-top-to-bottom frame of the information flow, which is convenient for the user to slide and play, and to start and end at any time, thereby lowering the threshold of man-machine interaction. In addition, the interaction material displayed in the search box can improve the user's interaction experience, and enhance the attraction of the information flow to the user.

Figure 7:
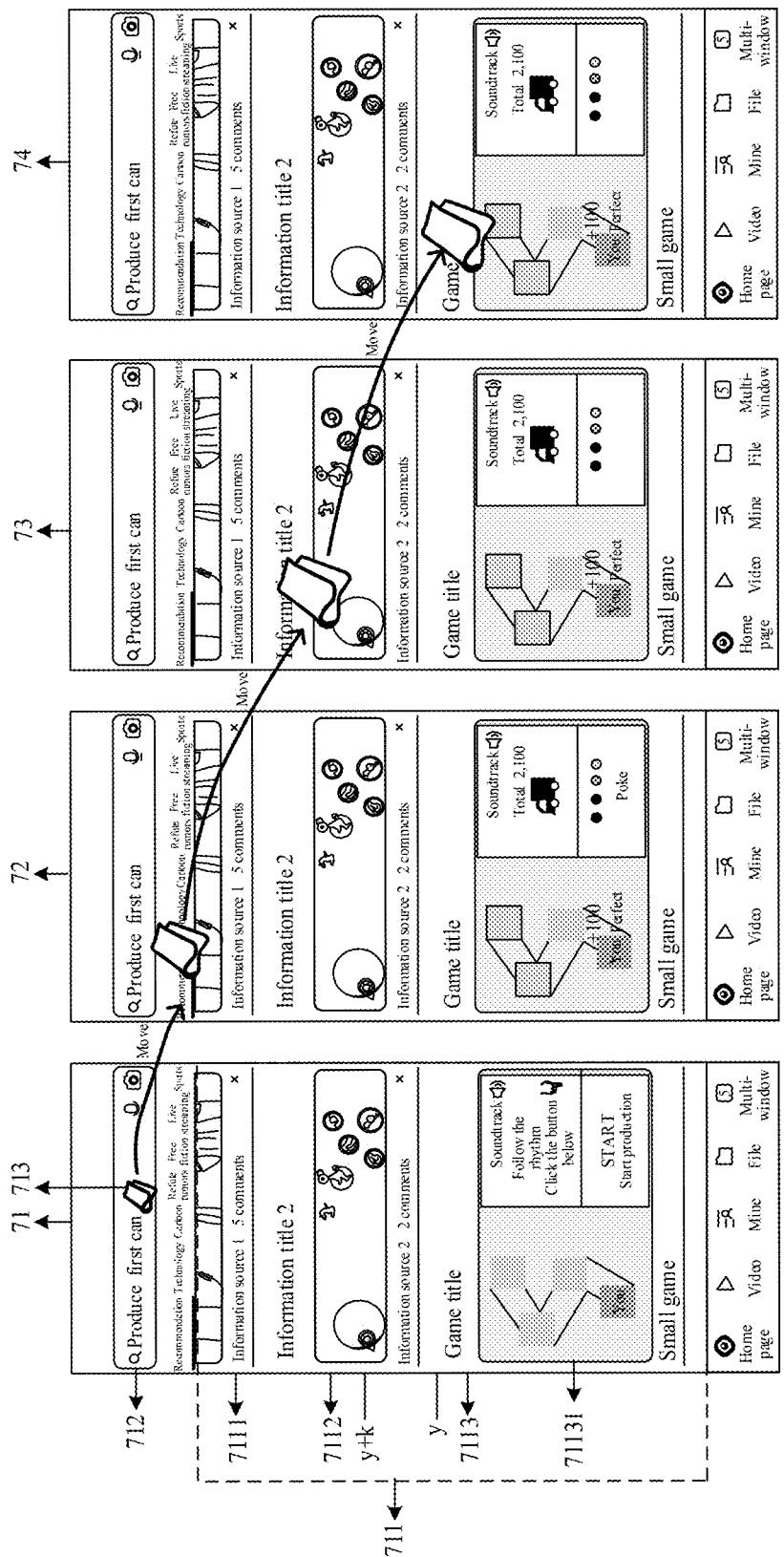

The embodiments of this application further provide a schematic diagram of an application interface shown in FIG. 7. FIG. 7 shows recommendation interfaces 71, 72, 73, and 74 of an application. The recommendation interfaces 71, 72, 73, and 74 are substantially the same interface, and the different names are only for the convenience of distinguishing the state of the interface at different time points. In the recommendation interface 71, an information flow region 711 and a search box 712 are displayed. An information flow in the information flow region 711 includes information 7111 and information 7112. Only a part of the information 7111 is shown, and the information flow region 711 further includes small game Information 7113. A big picture region 71131 in the small game information 7113 is embedded with an interactive small game. In the recommendation interface 71, the small game information 7113 has been slid to a base point in the recommendation interface 71, that is, the height of the top of the small game information 7113 is within a height range of y to (y+k). Therefore, interaction materials corresponding to the small game embedded into the big picture region 71131 are displayed in the search box 712, which may include a game element 713 and game copywriting "produce first can", where both y and k are numbers greater than 0, and (y+k) is less than or equal to the top height of the information flow region 711. As shown in the recommendation interfaces 72, 73, and 74, after the game element 713 is displayed in the search box 712 for n seconds, the game element drops down (moves) to the information flow region 711, and finally drops into the big picture region 71131. The user may click or long press the game element 713 in the big picture region 71131, to eliminate the game element 713 and interact with the small game. In the big picture region 71131 in FIG. 7, the embedded small game includes a start button. When the start button is triggered, the small game enters the in-game state, and the search box 712 displays interaction materials. Certainly, before the start button is triggered, the search box 712 may also display a prompt for the start of the small game or other game copywriting.

Figure 8:
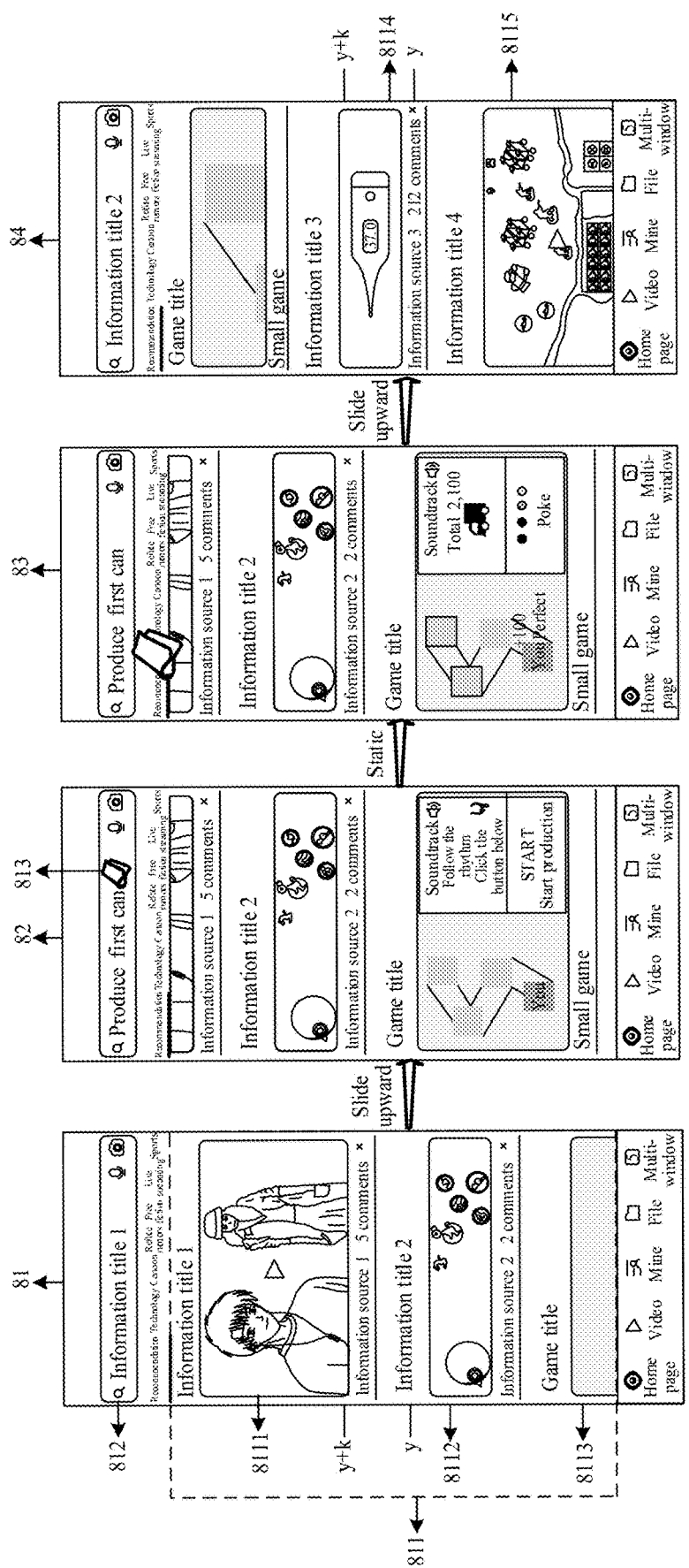

The embodiments of this application further provide a schematic diagram of an application interface shown in FIG. 8. FIG. 8 shows recommendation interfaces 81, 82, 83, and 84 of an application. The recommendation interfaces 81, 82, 83, and 84 are substantially the same interface, and the different names are only for the convenience of distinguishing the state of the interface at different time points. In the recommendation interface 81 shown in FIG. 8, an information flow region 811 and a search box 812 are shown. An information flow in the information flow region 811 includes information 8111 and information 8112. The information flow region 811 further includes small game Information 8113. In the recommendation interface 81, the height of the top of the small game information 8113 is not within base points y to (y+k), so that an information material of hot information in the information flow is displayed in the search box 812. An information title 1 is used as an example in FIG. 8.

On the basis of the recommendation interface 81, if it is detected that the user performs an upward sliding operation on the information flow in the information flow region 811, the recommendation interface 82 can be obtained. In the recommendation interface 82, the height of the top of the small game information 8113 is already within the base points y to (y+k), so that an interaction material corresponding to the small game embedded into the small game information 8113 is displayed in the search box 812, which may include a game element 813 and game copywriting "produce first can". On the basis of the recommendation interface 82, if no operation performed by the user is detected, the recommendation interface 83 can be obtained. Compared with the recommendation interface 82, a position of game copywriting in the recommendation interface 83 is fixed, while the position of the game element 813 has dropped down for a certain distance. On the basis of the recommendation interface 83, if it is detected that the user performs an upward sliding operation on the information flow in the information flow region 811, the recommendation interface 84 can be obtained. In the recommendation interface 84, the height of the top of the small game information 8113 is not within the base points y to (y+k), so that the search box 812 stops displaying an interaction material and displays an information material of hot information in the information flow. An information title 2 is used as an example in FIG. 8. In addition, in the recommendation interface 84, the information flow region 811 further includes newly shown information 8114 and newly shown information 8115. As shown in FIG. 8, regardless of whether the small game is currently in the in-game state, the user only needs to slide the information flow upward, to enable the position of the small game information exceeds the base points, then the game can be ended and the user continues to browse other information in the information flow. In this case, the backend records and caches the user's last game data (corresponding to the foregoing progress data). When it is detected that the user slides the small game information to the base points y to (y+k) again, the small game can continue to start following the cached game data. The game data may include a user score for the small game, a position of a game element in the interface, and the like.

Figure 9:
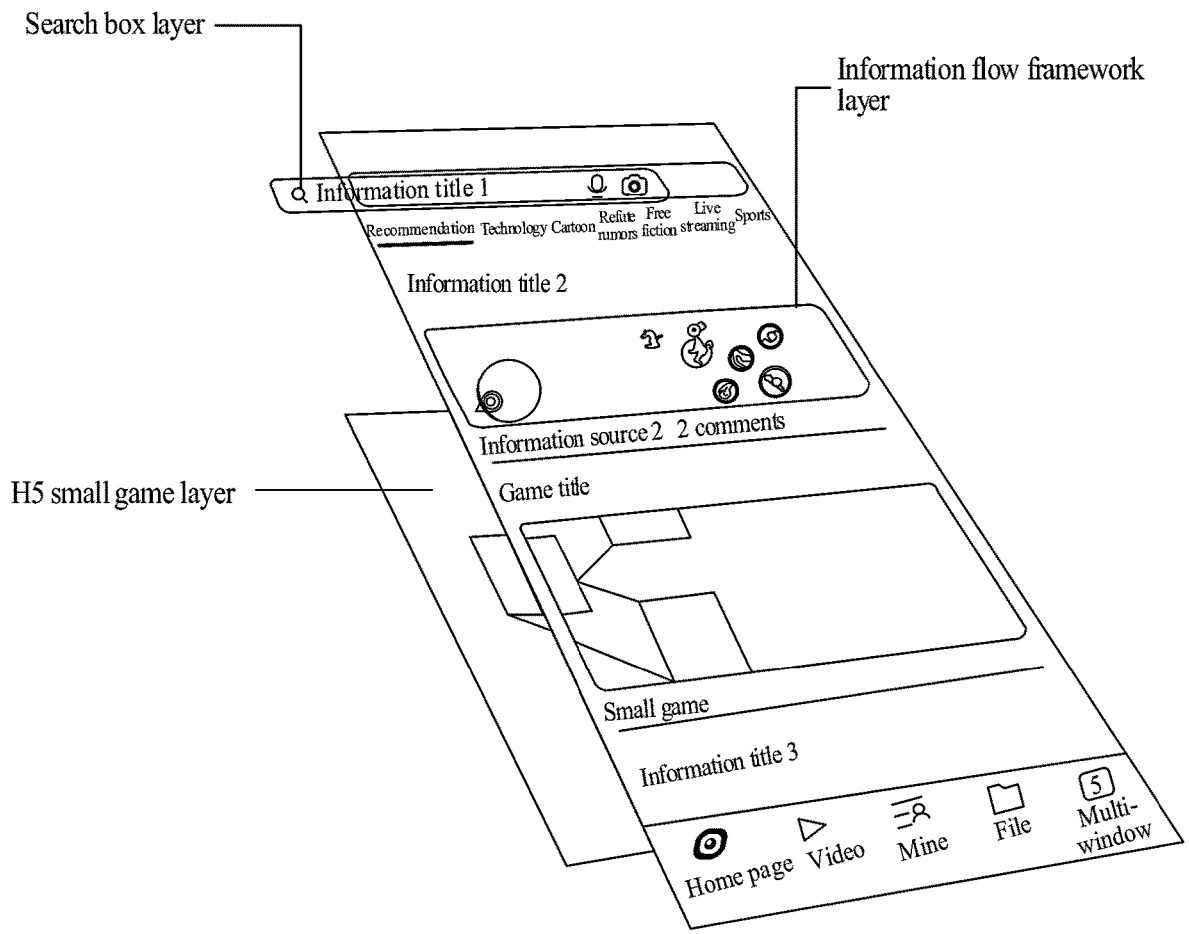
FIG. 9 is a schematic architectural diagram of an interface view of an application according to an embodiment of this application.

Subsequently, an implementation of a drop mechanism of game elements is described. As shown in FIG. 9, an example in which the embedded interactive content is a Hyper Text Markup Language (HTML) 5 small game is used. The interface view of the application may be divided into a search box layer (corresponding to the foregoing search layer), an information flow framework layer, and an H5 small game layer (corresponding to the foregoing interaction layer). Game elements perform communication and are displayed between these three layers.

Herein, a display process of a game element corresponding to the H5 small game is described in the form of steps:

1) The game element is displayed in the search box.

Figure 10:
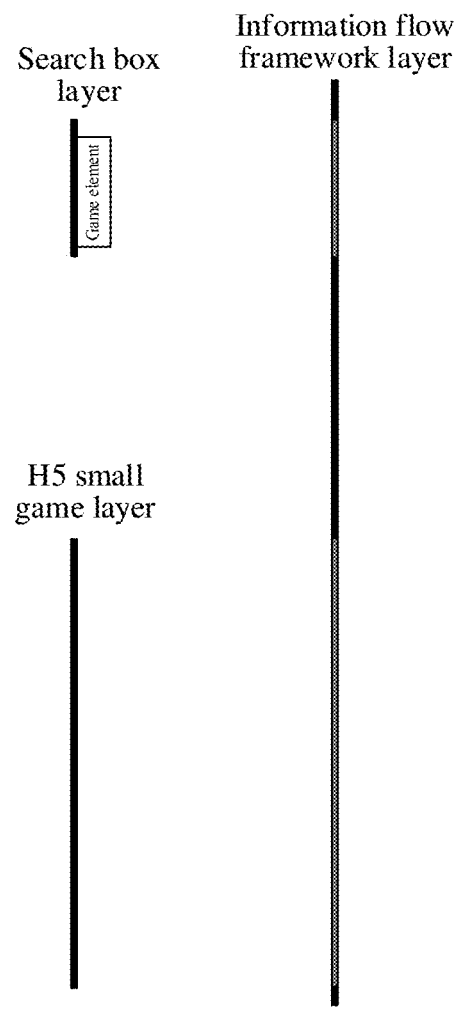
FIG. 10 to FIG. 13 are schematic diagrams showing a game element according to an embodiment of this application.

As shown in FIG. 10, the search box layer first controls the game element and game copywriting to be displayed in the search box, and the appearance timing of the game element and the game copywriting may be determined according to an actual service logic. The game element and the game copywriting may be literal characters, images, or other formats. The images are, for example, portable network graphics (PNG).

2) The game element rises to the information flow framework layer.

Figure 11:
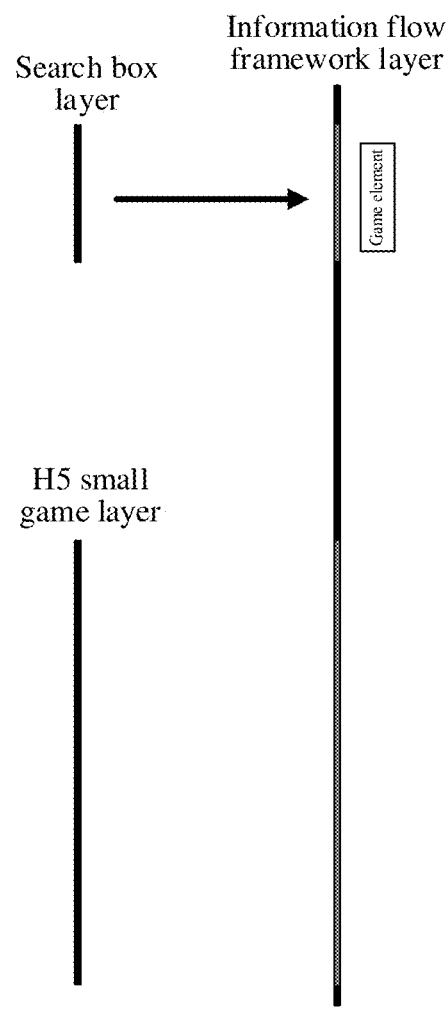

As shown in FIG. 11, after the game element is displayed in the search box for n seconds, the search box layer stops displaying the game element. That is, the game element disappears from the search box. The information flow framework layer controls the game element to appear in the information flow region, and seamless connection may be performed therebetween through animation or borrowing to achieve the effect of continuous layers. n may be determined according to characteristics of the H5 small game in an actual application scenario.

3) The game element moves in the information flow region.

Figure 12:
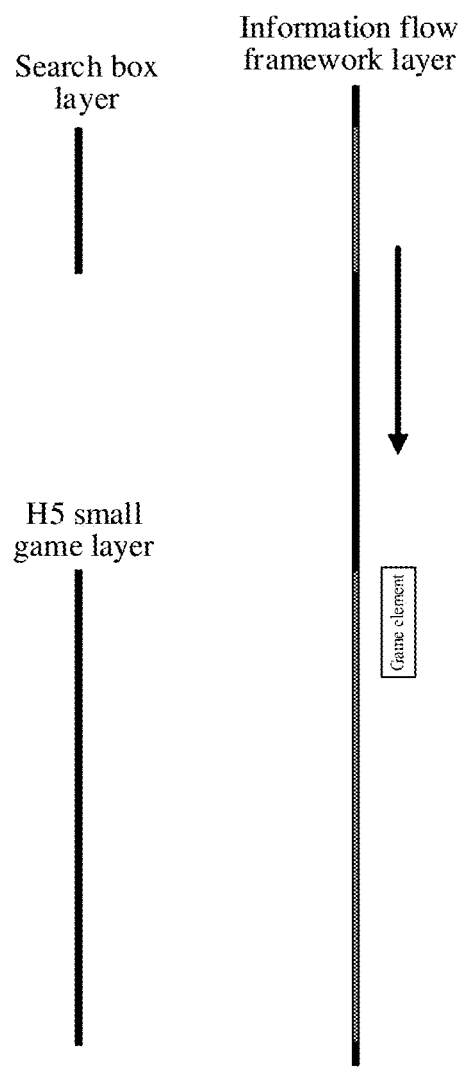

As shown in FIG. 12, the information flow framework layer controls the game element to move from top to bottom in the information flow region. During the movement, the game element covers part of the content in the information flow region. The logic for moving and covering of the game element may be similar to a floating patch advertisement.

4) The game element moves to a region in which the H5 small game is located.

Figure 13:
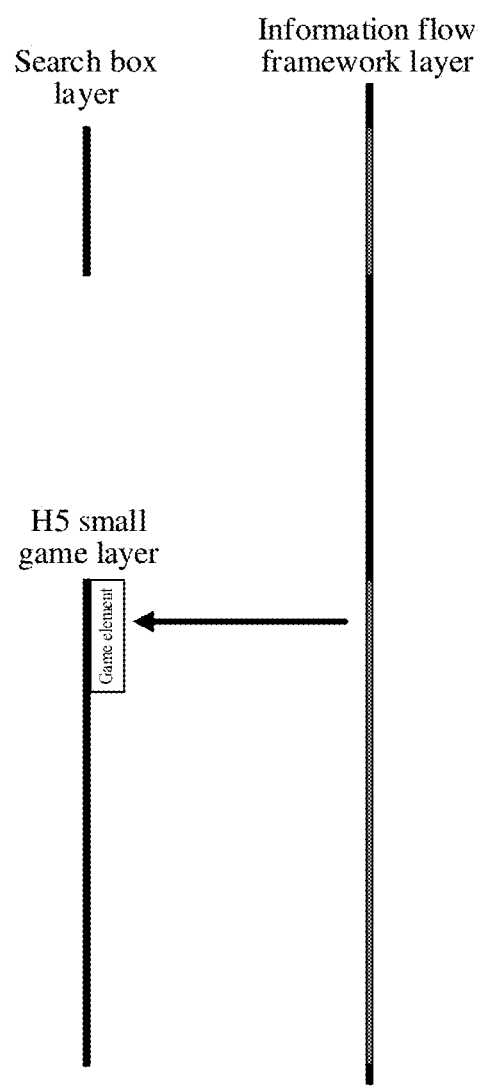

As shown in FIG. 13, when the game element moves to the region in which the H5 small game is located, that is, the interaction region, the information flow framework layer controls the game element to disappear from the information flow region, and simultaneously sends a notification to the H5 small game layer, to make the H5 small game layer correspondingly display the game element during the H5 small game. Similarly, seamless connection may be performed therebetween through animation or borrowing to achieve the effect of continuous layers.

Figure 14:
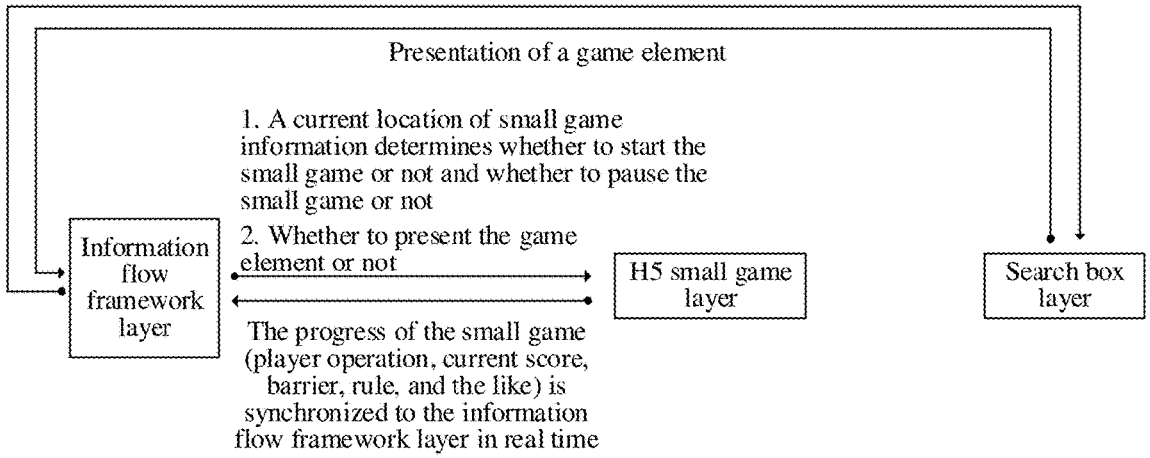
FIG. 14 is a schematic diagram of communication feedback between a plurality of layers according to an embodiment of this application.

The embodiments of this application further provide a schematic diagram of communication feedback between the search box layer, the information flow framework layer and the H5 small game layer shown in FIG. 14. In FIG. 14, the information flow framework layer performs locating according to the current position of the small game information, and notifies the H5 small game layer to start or pause (end) the small game. Because the H5 small game layer and the search box layer cannot communicate with each other, the H5 small game layer synchronizes the progress (corresponding to the foregoing progress data) of the small game to the information flow framework layer in real time, and then the information flow framework layer synchronizes the progress to the search box layer. The progress of the small game includes, but not limited to, a player operation, a current score, a barrier, and a rule, and may further include an interaction material. The game element is used as an example herein. The search box layer first displays the game element in the search box, then notifies the information flow framework layer to display the game element in the information flow region, and finally the information flow framework layer notifies the H5 small game layer to display the game element in the H5 small game.

Figure 15:
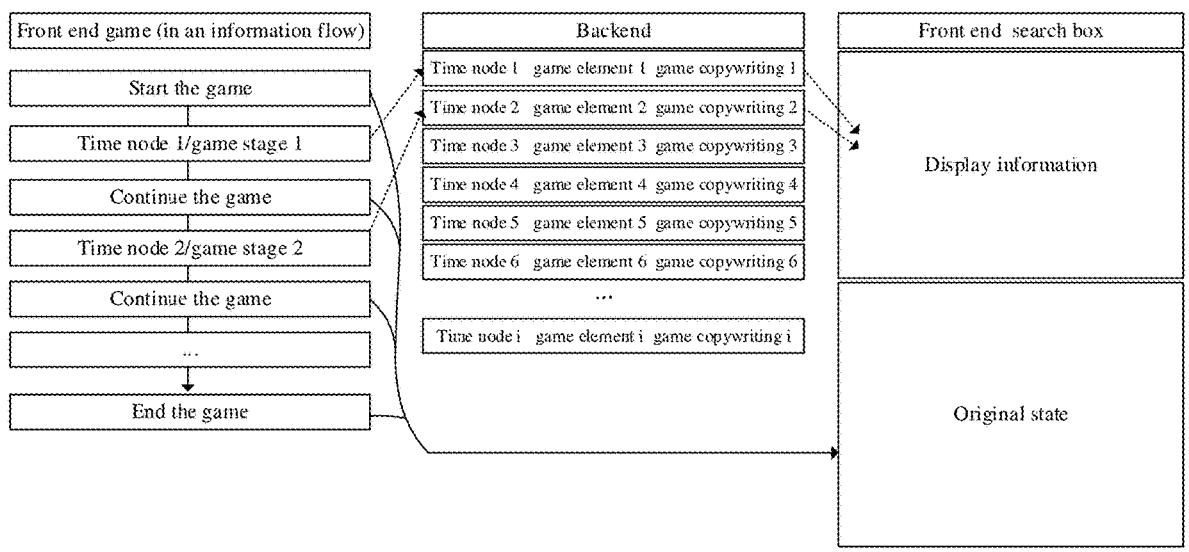
FIG. 15 is a schematic diagram of a correspondence between a real-time game process and an interaction material according to an embodiment of this application.

In the backend, a game element or game copywriting corresponding to the real-time game process is preset. For example, different game stages (corresponding to the foregoing interaction time stages) may be set to correspond to different game elements and game copywriting, or different time nodes may be set to correspond to different game elements and game copywriting. The time nodes may include the foregoing interaction time nodes in some embodiments. When the user reaches a certain game stage or time node during playing of the small game, the foreground (for example, the H5 small game layer) detects it and sends the data to the backend. The backend returns a corresponding game element and corresponding game copywriting for display in the search box. For example, in a small game of collecting gold coins, game elements may be gold coins and bombs, both of which may be presented and dropped from the search box; and the game copywriting may be a prompt of "a big wave of gold coins are coming" or "watch out for the bomb". An embodiment of this application provides a schematic diagram of a correspondence between a real-time game process and an interaction material. As shown in FIG. 15, if it is detected that the real-time game process is at a set time node or game stage, a game element and game copywriting corresponding to the time node or game stage are displayed in the search box at the front end, where i in FIG. 15 is an integer greater than 6.

This embodiment of this application creates a mechanism for the communication between the small game and the search box, which can enhance the user's cognition of the search box, organically combine the search box and the information flow in the process of playing the small game, and lower the threshold for the user to participate in the small game, thereby improving the efficiency and experience of man-machine interaction.

The following continues to describe an example structure of a software module that the interaction processing apparatus for an information flow 455 provided in the embodiments of this application is implemented as. In some embodiments, as shown in FIG. 3, a software module in an interaction processing apparatus for an information flow 455 stored in the memory 450 may include: an information flow module 4551, configured to display an information flow in an information flow region, at least one interaction region being inserted into the information flow; a search module 4552, configured to display an interaction material corresponding to the interaction region in a search region; and An interaction module 4553, configured to display, in response to an interaction operation for the interaction region, an interaction process based on the interaction material in the interaction region.

In some embodiments, the information flow module 4551 is further configured to: load a transparent region between information displayed in the information flow region, and display at least one loaded interaction region through the transparent region; or load at least one interaction region between the information displayed in the information flow region.

In some embodiments, the search module 4552 is further configured to: stop displaying the interaction material in the search region. The information flow module 4551 is further configured to: display a process in which the interaction material moves from the search region to the information flow region and a process in which the interaction material moves from the information flow region to the interaction region. The interaction module 4553 is further configured to: display, in response to an interaction operation for the interaction material, the interaction process based on the interaction material in the interaction region.

In some embodiments, the interaction module 4553 is further configured to: receive the interaction operation for the interaction region, determine interaction response data used for responding to the interaction operation, and display the interaction process based on the interaction material in the interaction region according to the interaction response data.

In some embodiments, the interaction module 4553 is further configured to: determine a real-time time node corresponding to the real-time interaction process in a plurality of time nodes of the interaction process; obtain an interaction material corresponding to the real-time time node as a new interaction material adapted to the interaction process; and display the new interaction material in the search region.

In some embodiments, types of the plurality of time nodes include interaction time nodes and non-interaction time nodes; and the interaction module 4553 is further configured to: when the real-time time node belongs to the interaction time nodes, obtain the interaction material corresponding to the real-time time node, the interaction material including at least one of an interaction element and an interaction introduction, the interaction introduction being used for indicating a state of the interaction process and an interaction operation capable of being performed; and when the real-time time node belongs to the non-interaction time nodes, obtain an information material corresponding to the real-time time node, and display the information material in the search region, the information material being corresponding to information in the information flow.

In some embodiments, the interaction module 4553 is further configured to: cache, in response to an interaction end operation for the interaction region, progress data of the interaction process displayed in the interaction region, and resume displaying, in response to the interaction operation for the interaction region, a progress of the interaction process in the interaction region according to the cached progress data.

In some embodiments, the search module 4552 is further configured to: display the interaction material corresponding to the interaction region in the search region when the interaction region meets an interaction condition, the interaction condition including at least one of the following: a position of the interaction region in the information flow region being at a set position; a stay duration of the interaction region in the information flow region being greater than a duration threshold; and a last piece of information displayed in the interaction region being separated by K pieces of information from a last piece of information displayed in the information flow region, K being a non-negative integer.

In some embodiments, when the interaction condition includes that the position of the interaction region in the information flow region is at the set position, the search module 4552 is further configured to: stop displaying the interaction material corresponding to the interaction region in the search region when the position of the interaction region in the information flow region is away from the set position.

In some embodiments, the search module 4552 is further configured to: perform any one of the following processing: alternately displaying interaction materials respectively corresponding to a plurality of interaction regions in the search region; and alternately displaying interaction materials respectively corresponding to the plurality of interaction regions and information materials respectively corresponding to a plurality of pieces of information in the information flow in the search region.

In some embodiments, the information flow module 4551 is further configured to: update, in response to a movement operation for the information flow, a position of information in the information flow in the information flow region and a position of the interaction region in the information flow region.

In some embodiments, the search module 4552 is further configured to: receive a keyword entered in the search region; and search the information flow for information matching the keyword, and display a detail interface corresponding to the information matching the keyword.

In some embodiments, the information flow module 4551 is further configured to: adjust, according to a trigger frequency of the interaction operation, a proportion of the at least one interaction region inserted into the information flow, the proportion being in a positive correlation with the trigger frequency.

In some embodiments, an interface view of an application running on the electronic device includes an information flow framework layer, a search layer, and an interaction layer, the information flow framework layer being configured to display the information flow in the information flow region, the search layer being configured to display the interaction material in the search region, and the interaction layer being configured to display, in response to the interaction operation, the interaction process based on the interaction material in the interaction region.

In some embodiments, the information flow module 4551 is further configured to: load, by the information flow framework layer, a transparent region between information displayed in the information flow region, and display, by the interaction layer, at least one loaded interaction region through the transparent region; or load, by the information flow framework layer, the at least one interaction region between the information displayed in the information flow region.

In some embodiments, the search module 4552 is further configured to: stop, by the search layer, displaying the interaction material in the search region; and the information flow module 4551 is further configured to: display, by the information flow framework layer, a process in which the interaction material moves from the search region to the information flow region and a process in which the interaction material moves from the information flow region to the interaction region. The interaction module 4553 is further configured to: display, by the interaction layer in response to an interaction operation for the interaction material, the interaction process based on the interaction material in the interaction region.

In some embodiments, the interaction module 4553 is further configured to: when a transparent region corresponding to the interaction region is loaded by the information flow framework layer in the information flow region, receive, by the interaction layer, the interaction operation for the interaction region transmitted by the information flow framework layer, determine the interaction response data used for responding to the interaction operation, and display the interaction process based on the interaction material according to the interaction response data; and when the interaction region is loaded by the information flow framework layer in the information flow region, transmit, by the information flow framework layer, the received interaction operation corresponding to the interaction region to the interaction layer, receive the interaction response data determined by the interaction layer according to the interaction operation, and display the interaction process based on the interaction material in the interaction region according to the interaction response data.

In some embodiments, the interaction module 4553 is further configured to: determine, by the interaction layer, a real-time time node corresponding to the real-time interaction process in a plurality of time nodes of the interaction process; obtain, by the interaction layer, an interaction material corresponding to the real-time time node as a new interaction material adapted to the interaction process; and notify, by the interaction layer, the search region to display the new interaction material.

In some embodiments, types of the plurality of time nodes include interaction time nodes and non-interaction time nodes; and the interaction module 4553 is further configured to: when the real-time time node belongs to the interaction time nodes, obtain, by the interaction layer, the interaction material corresponding to the real-time time node, the interaction material including at least one of an interaction element and an interaction introduction, the interaction introduction being used for indicating a state of the interaction process and an interaction operation capable of being performed; and when the real-time time node belongs to the non-interaction time nodes, obtain, by the interaction layer, an information material corresponding to the real-time time node, and notify the search region to display the information material, the information material being corresponding to information in the information flow.

In some embodiments, the interaction module 4553 is further configured to: cache, by the interaction layer in response to an interaction end operation for the interaction region, progress data of the interaction process displayed in the interaction region, and resume displaying, in response to the interaction operation for the interaction region, a progress of the interaction process in the interaction region according to the cached progress data.

In some embodiments, the search module 4552 is further configured to: notify, by the information flow framework layer when the interaction region meets an interaction condition, the search layer, so that the search layer displays the interaction material corresponding to the interaction region in the search region, the interaction condition including at least one of the following: a position of the interaction region in the information flow region being at a set position; a stay duration of the interaction region in the information flow region being greater than a duration threshold; and a last piece of information displayed in the interaction region being separated by K pieces of information from a last piece of information displayed in the information flow region, K being a non-negative integer.

In some embodiments, when the interaction condition includes that the position of the interaction region in the information flow region is at the set position, the search module 4552 is further configured to: when the position of the interaction region in the information flow region is away from the set position, notify, by the information flow framework layer, the search layer, so that the search layer stops displaying the interaction material corresponding to the interaction region in the search region.

In some embodiments, the search module 4552 is further configured to: perform any one of the following processing: alternately displaying, by the search layer, interaction materials respectively corresponding to a plurality of interaction regions in the search region; and alternately displaying, by the search layer, interaction materials respectively corresponding to the plurality of interaction regions and information materials respectively corresponding to a plurality of pieces of information in the information flow in the search region.

In some embodiments, the information flow module 4551 is further configured to: update, by the information flow framework layer in response to a movement operation for the information flow, a position of information in the information flow in the information flow region and a position of the interaction region in the information flow region.

In some embodiments, the search module 4552 is further configured to: receive, by the search layer, a keyword entered in the search region; and search the information flow for information matching the keyword, and display a detail interface corresponding to the information matching the keyword.

In some embodiments, the information flow module 4551 is further configured to: adjust, by the information flow framework layer according to a trigger frequency of the interaction operation, a proportion of the at least one interaction region inserted into the information flow, the proportion being in a positive correlation with the trigger frequency.

In some embodiments, the search module 4552 is further configured to: transmit, by the interaction layer, the interaction material corresponding to the interaction region to the information flow framework layer; transmit, by the information flow framework layer, the received interaction material to the search layer; and display, by the search layer, the received interaction material in the search region.

In some embodiments, the application running on the electronic device includes a first application and a second application, an interface view of the first application including the information flow framework layer and the search layer, and an interface view of the second application including the interaction layer.

An embodiment of this application provides a computer program product or a computer program. The computer program product or the computer program includes executable instructions, and the executable instructions are stored in a computer-readable storage medium. A processor of a computer device reads the executable instructions from the computer-readable storage medium, and executes the executable instructions, to cause the computer device to perform the foregoing interaction processing method for an information flow in the embodiments of this application.

An embodiment of this application provides a computer-readable storage medium storing executable instructions. When the executable instructions are executed by a processor, the processor is caused to perform the method provided in the embodiments of this application, for example, the interaction processing method for an information flow shown in FIG. 5A, FIG. 5B, FIG. 5C, FIG. 5D, FIG. 5E, FIG. 5F, FIG. 5G, and FIG. 5H. The computer includes various computing devices such as a terminal device and a server.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In one example, the executable instructions may, but not necessarily, correspond to a file in a file system, and may be stored in a part of a file that saves another program or other data, for example, be stored in one or more scripts in an HTML file, stored in a file that is specially used for a program in discussion, or stored in the plurality of collaborative files (for example, be stored in files of one or modules, subprograms, or code parts).

In one example, the executable instructions can be deployed for execution on one computing device, execution on a plurality of computing devices located at one location, or execution on a plurality of computing devices that are distributed at a plurality of locations and that are interconnected through a communication network.

Based on the above, the following technical effects can be achieved through the embodiments of this application:

1) By inserting at least one interaction region into an information flow, a user can smoothly participate in interaction during the process of browsing the information flow, which improves the efficiency of man-machine interaction. Moreover, by displaying the interaction material in the search region, the user can better perform interaction according to the interaction material, which improves the man-machine interaction experience, and can also increase the actual utilization of computing resources consumed by the electronic device in the interaction processing process.

2) For the case in which the interaction layer and the search layer cannot communicate with each other, the information flow framework layer is used as a medium for communication between the interaction layer and the search layer, which improves the effectiveness of data communication and the applicability to actual application scenarios.

3) According to a trigger frequency of an interaction region, a proportion of interaction regions inserted into the information flow is adjusted accordingly, which can improve the pertinence for different users and avoid the user's disgust caused by the inserted interaction region.

4) By presetting materials to be displayed at different time nodes or time stages, the accuracy and timeliness of the display of the search region are improved.

5) When the interaction region meets an interaction condition, interaction is entered, and an interaction material corresponding to the interaction region is displayed in the search region, which can strengthen the rationality of the timing of displaying the interaction material.

6) By moving the interaction material from the search region to the interaction region, the interaction material can be highlighted in the interface, thereby further enhancing the experience of man-machine interaction.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. An interaction processing method for an information flow comprising:
   displaying the information flow in an information flow region, at least one interaction region being inserted into the information flow;
   displaying an interaction material corresponding to the interaction region in a search region;
   displaying, in response to an interaction operation from the interaction region, an interaction process based on the interaction material in the interaction region;
   determining a real-time time node corresponding to a real-time interaction process in a plurality of time nodes of the interaction process;
   obtaining an interaction material corresponding to the real-time time node as a new interaction material adapted to the interaction process; and
   displaying the new interaction material in the search region.

2. The interaction processing method according to claim 1, further comprising:
   loading a transparent region between information displayed in the information flow region;
   displaying at least one loaded interaction region through the transparent region; and
   loading the at least one interaction region between the information displayed in the information flow region.

3. The interaction processing method according to claim 1, wherein before the displaying the interaction process, the method further comprises:
   stopping the displaying of the interaction material in the search region; and
   displaying a process in which the interaction material moves from the search region to the information flow region and a process in which the interaction material moves from the information flow region to the interaction region; and
   wherein the displaying the interaction process further comprises:
   displaying, in response to an interaction operation for the interaction material, the interaction process based on the interaction material in the interaction region.

4. The interaction processing method according to claim 1, wherein the displaying the interaction process further comprises:
   receiving the interaction operation for the interaction region;
   determining interaction response data used for responding to the interaction operation; and
   displaying the interaction process based on the interaction material in the interaction region according to the interaction response data.

5. The interaction processing method according to claim 1, wherein types of the plurality of time nodes comprise interaction time nodes and non-interaction time nodes, further wherein the obtaining the interaction material further comprises:
   obtaining, when the real-time time node belongs to the interaction time nodes, the interaction material corresponding to the real-time time node, wherein the interaction material comprises at least one of an interaction element and an interaction introduction, the interaction introduction being used for indicating a state of the interaction process and an interaction operation capable of being performed, wherein the method further comprises:
   obtaining, when the real-time time node belongs to the non-interaction time nodes, an information material corresponding to the real-time time node; and
   displaying the information material in the search region, wherein the information material corresponds to information in the information flow.

6. The interaction processing method according to claim 1, further comprising:
   caching, in response to an interaction end operation for the interaction region, progress data of the interaction process displayed in the interaction region, and
   resuming displaying, in response to the interaction operation for the interaction region, a progress of the interaction process in the interaction region according to the cached progress data.

7. The interaction processing method according to claim 1, wherein the displaying the interaction material further comprises:
   displaying the interaction material corresponding to the interaction region in the search region when the interaction region meets an interaction condition, wherein the interaction condition comprises at least one of the following:
   a position of the interaction region in the information flow region being at a set position;
   a stay duration of the interaction region in the information flow region being greater than a duration threshold; and
   a last piece of information displayed in the interaction region being separated by K pieces of information from a last piece of information displayed in the information flow region, K being a non-negative integer.

8. The interaction processing method according to claim 7, wherein when the interaction condition comprises that a position of the interaction region in the information flow region is at a set position, the method further comprises:
   stopping the displaying of the interaction material corresponding to the interaction region in the search region when the position of the interaction region in the information flow region is away from the set position.

9. The interaction processing method according to claim 1, wherein the displaying the interaction material further comprises:
performing any one of the following processing:
alternately displaying interaction materials respectively corresponding to a plurality of interaction regions in the search region; or
alternately displaying interaction materials respectively corresponding to the plurality of interaction regions and information materials respectively corresponding to a plurality of pieces of information in the information flow in the search region.

10. The interaction processing method according to claim 1, further comprising:
updating, in response to a movement operation for the information flow, a position of information in the information flow in the information flow region and updating a position of the interaction region in the information flow region.

11. The interaction processing method according to claim 1, further comprising:
receiving a keyword entered in the search region;
searching the information flow for information matching the keyword; and
displaying a detail interface corresponding to the information matching the keyword.

12. The interaction processing method according to claim 1, further comprising:
adjusting, according to a trigger frequency of the interaction operation, a proportion of the at least one interaction region inserted into the information flow, wherein the proportion is in a positive correlation with the trigger frequency.

13. An electronic device comprising:
an interface view of an application running on the electronic device that comprises:
an information flow framework layer configured to display an information flow in an information flow region;
a search layer configured to display an interaction material in a search region; and
an interaction layer configured to:
display, in response to an interaction operation, an interaction process based on the interaction material in an interaction region;
determining a real-time time node corresponding to a real-time interaction process in a plurality of time nodes of the interaction process;
obtaining an interaction material corresponding to the real-time time node as a new interaction material adapted to the interaction process; and
displaying the new interaction material in the search region.

14. The electronic device according to claim 13, wherein the information flow framework layer is further configured for:
loading a transparent region between the information displayed in the information flow region, and interaction layer is configured for displaying at least one loaded interaction region through the transparent region; or
loading the at least one interaction region between the information displayed in the information flow region.

15. The electronic device according to claim 13, wherein the interaction layer is further configured for:
receiving, when a transparent region corresponding to the interaction region is loaded by the information flow framework layer in the information flow region, the interaction operation for the interaction region transmitted by the information flow framework layer;
determining interaction response data used for responding to the interaction operation;
displaying the interaction process based on the interaction material in the interaction region according to the interaction response data;
transmitting, when the interaction region is loaded by the information flow framework layer in the information flow region, the received interaction operation for the interaction region to the interaction layer;
receiving the interaction response data determined by the interaction layer according to the interaction operation; and
displaying the interaction process based on the interaction material in the interaction region according to the interaction response data.

16. The electronic device according to claim 13, wherein the interaction layer is further configured for transmitting the interaction material corresponding to the interaction region to the information flow framework layer; the information flow framework layer is further configured for transmitting the interaction material to the search layer; and the search layer is further configured for displaying the received interaction material in the search region.

17. The electronic device according to claim 13, wherein the application running on the electronic device comprises a first application and a second application, wherein an interface view of the first application comprising the information flow framework layer and the search layer, and an interface view of the second application comprising the interaction layer.

18. A computer-readable, non-transitory storage medium, storing executable instructions, the executable instructions, when executed by a processor, causing the processor to:
display an information flow in an information flow region, at least one interaction region being inserted into the information flow;
display an interaction material corresponding to the interaction region in a search region; and
display, in response to an interaction operation from the interaction region, an interaction process based on the interaction material in the interaction region;
determine a real-time time node corresponding to a real-time interaction process in a plurality of time nodes of the interaction process;
obtain an interaction material corresponding to the real-time time node as a new interaction material adapted to the interaction process; and
display the new interaction material in the search region.

19. The computer-readable, non-transitory storage medium of claim 18, wherein the instructions further cause the processor to:
load a transparent region between information displayed in the information flow region;
display at least one loaded interaction region through the transparent region; and
load the at least one interaction region between the information displayed in the information flow region.

20. The computer-readable, non-transitory storage medium of claim 18, wherein types of the plurality of time nodes comprise interaction time nodes and non-interaction time nodes, further wherein to obtain the interaction material, the processor is configured to execute the executable instructions to:
obtain, when the real-time time node belongs to the interaction time nodes, the interaction material corresponding to the real-time time node, wherein the interaction material comprises at least one of an interaction element and an interaction introduction, the interaction introduction being used for indicating a state of the interaction process and an interaction operation capable of being performed;

obtain, when the real-time time node belongs to the non-interaction time nodes, an information material corresponding to the real-time time node; and display the information material in the search region, wherein the information material corresponds to information in the information flow.

* * * * *

UNITED STATES PATENT AND TRADEMARK OFFICE
CERTIFICATE OF CORRECTION

| | | |
|---|---|---|
| PATENT NO. | : 11,914,846 B2 | |
| APPLICATION NO. | : 17/718883 | |
| DATED | : February 27, 2024 | |
| INVENTOR(S) | : Qiqi Luo et al. | |

It is certified that error appears in the above-identified patent and that said Letters Patent is hereby corrected as shown below:

In the Claims

Column 38, Claim 16, Line 24, delete "received"

Signed and Sealed this
Sixteenth Day of April, 2024

Katherine Kelly Vidal
*Director of the United States Patent and Trademark Office*